(12) United States Patent
Thuot et al.

(10) Patent No.: US 8,824,051 B2
(45) Date of Patent: Sep. 2, 2014

(54) PASSIVE LOUVER-BASED DAYLIGHTING SYSTEM

(71) Applicant: Massachusetts Institute of Technology, Cambridge, MA (US)

(72) Inventors: Kevin W. Thuot, Austin, TX (US); Marilyne Andersen, Penthaz (CH)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 13/888,045

(22) Filed: May 6, 2013

(65) Prior Publication Data

US 2013/0321923 A1 Dec. 5, 2013

Related U.S. Application Data

(62) Division of application No. 13/222,533, filed on Aug. 31, 2011, now Pat. No. 8,462,437.

(60) Provisional application No. 61/413,804, filed on Nov. 15, 2010.

(51) Int. Cl.
  *G02B 27/00* (2006.01)
  *F21S 11/00* (2006.01)
  *E06B 9/24* (2006.01)
  *E06B 9/386* (2006.01)

(52) U.S. Cl.
  CPC .............. *G02B 27/00* (2013.01); *F21S 11/00* (2013.01); *E06B 9/24* (2013.01); *E06B 9/386* (2013.01)
  USPC ............... 359/596; 52/200; 52/201; 52/204.5

(58) Field of Classification Search
  CPC ................................. G02B 1/00; E04B 1/00
  USPC ..................... 359/596; 52/200, 201, 204.5
  See application file for complete search history.

(56) References Cited

U.S. PATENT DOCUMENTS 2,546,335 A * 3/1951 Friend .......................... 359/596
3,014,252 A * 12/1961 Osborne .................... 52/786.11

(Continued)

FOREIGN PATENT DOCUMENTS

AU 15055 92 A 11/1993
DE 29 42 497 A1 4/1981

(Continued)

OTHER PUBLICATIONS

P.C. Eames et al., 'A window blind reflector system for the deeper penetration of daylight into rooms without glare', Apr. 1994, International Journal of Ambient Energy, vol. 15, No. 2.*

(Continued)

*Primary Examiner* — Clayton E Laballe
*Assistant Examiner* — Kevin Butler
(74) *Attorney, Agent, or Firm* — Goodwin Procter LLP

(57) ABSTRACT

A daylighting system for use in a building including a louver array having a first longitudinal element, and a second longitudinal element spaced therefrom. At least one of the first and second elements has an asymmetrical profile, each of the first and second longitudinal elements has a bottom profile including a parabolic surface, portions of opposing surfaces of the first and second longitudinal elements define a compound parabolic concentrator profile having a non-horizontal centerline that is tilted upwards, and the array prevents line of sight therethrough. A louver for a daylighting system includes (i) a leading edge defined by a leading connecting surface disposal between a parabolic concentrator surface and a flat surface; and (ii) a trailing edge defined by a trailing connecting surface disposed between a lower compound parabolic concentrator profile, and an upper compound parabolic concentrator profile. A method for designing a louver profile is provided.

19 Claims, 25 Drawing Sheets

(56) References Cited

U.S. PATENT DOCUMENTS

| | | | |
|---|---|---|---|
| 3,077,643 A * | 2/1963 | Horner | 52/473 |
| 4,002,159 A * | 1/1977 | Angilletta | 126/600 |
| 4,023,555 A * | 5/1977 | Bailey | 126/601 |
| 4,143,640 A * | 3/1979 | Pierce | 126/600 |
| 4,232,731 A * | 11/1980 | Kaplow et al. | 165/48.2 |
| 4,459,975 A * | 7/1984 | Hobart | 126/702 |
| 4,699,467 A * | 10/1987 | Bartenbach et al. | 359/592 |
| 4,715,358 A | 12/1987 | Koster | |
| 5,293,305 A * | 3/1994 | Koster | 362/147 |
| 5,295,051 A * | 3/1994 | Cowling | 362/576 |
| 5,353,565 A * | 10/1994 | Tanikawa | 52/473 |
| 5,497,762 A * | 3/1996 | Rylewski | 126/702 |
| 5,944,411 A * | 8/1999 | Holten et al. | 362/342 |
| 6,239,910 B1 * | 5/2001 | Digert | 359/596 |
| 6,480,336 B2 | 11/2002 | Digert et al. | |
| 6,714,352 B2 * | 3/2004 | Rogers et al. | 359/596 |
| 7,070,314 B2 * | 7/2006 | Edmonds | 362/600 |
| 8,028,691 B2 * | 10/2011 | Maxson et al. | 126/702 |
| 8,101,850 B2 * | 1/2012 | McCall | 136/246 |
| 8,116,004 B2 | 2/2012 | Griffiths | |
| 2001/0019451 A1 * | 9/2001 | Digert et al. | 359/596 |
| 2003/0112518 A1 * | 6/2003 | Rogers et al. | 359/596 |
| 2004/0201977 A1 * | 10/2004 | Edmonds | 362/31 |
| 2008/0202703 A1 * | 8/2008 | Edmonds | 160/168.1 R |
| 2009/0020233 A1 * | 1/2009 | Berman et al. | 160/5 |
| 2009/0320388 A1 * | 12/2009 | Lilli et al. | 52/173.3 |
| 2010/0101565 A1 * | 4/2010 | Maxson et al. | 126/702 |
| 2011/0094564 A1 * | 4/2011 | McCall | 136/246 |
| 2012/0067340 A1 * | 3/2012 | Maxson et al. | 126/702 |

FOREIGN PATENT DOCUMENTS

| | | |
|---|---|---|
| DE | 43 10 717 A1 | 10/1994 |
| DE | 43 10 718 A1 | 10/1994 |
| EP | 0 800 035 A1 | 10/1997 |

OTHER PUBLICATIONS

Compagnon, R., Simulations Numeriques de Systemes D'Eclairage Naturel a Penetration Laterale. PhD Thesis. Lausanne: Ecole Polytechnique Federale de Lausanne, 1994.

Courret & Scartezzini "Application De L'Optique Anidolique a l'Eclairage Naturel Lateral D'Un Nouveau Batiment", 8. Schweizerisches Status-Seminar: Energieforschung Im Hochbau, (1994), pp. 346-352.

Eames, P. & Norton, B., 1994. A Window Blind Reflector System for the Deeper Penetration of Daylight into Room Without Glare. International Journal of Ambient Energy, vol. 15, No. 2, pp. 73-77.

International Search Report and Written Opinion for PCT/US2011/060784 mailed Mar. 2, 2012, 14 pgs.

International Search Report and Written Opinion for PCT/US2011/060784 mailed Mar. 2, 2012.

*LightLouver Daylighting System Homepage.*—Slat Ray Tracing Diagram, printed from http://lightlouver.com/performance-information/slat-ray-tracing-diagram/ on Nov. 2, 2011.

Ruck et al., *Daylight in Buildings: A Source Book on Daylighting Systems and Components*, a report of the International Energy Agency SHC Task 21/ECBCS Annex 29 (Jul. 2000), accessible at http://gaia.lbl.gov/iea21/ieapubc.htm.

Scartezzini and Courret, "Anidolic Daylighting Systems," Scartezzini, J.-L. & Courret, G., 2002. Anidolic Daylighting Systems. Solar Energy, 73(2), pp. 123-135).

Scartezzini and Courret, "Anidolic Daylighting Systems," Scartezzini, J.-L. & Courret, G., Solar Energy, vol. 73, No. 2, pp. 123-135, 2002.

Scartezzini, Solar Energy and Building Physics laboratory LESO-PB, EPFL/Anidolic systems, printed from http://leso.epfl.ch/page-35535-en.html Nov. 2, 2011.

Thuot, K. & Andersen, M., 2011. A Novel Louver System for Increasing Daylight Usage in Buildings. In Bodart, M. & Arnaud, E., eds. *International Conference on Passive and Low Energy Architecture*. Louvain-la-Neuve, 2011.

Winston, Roland, Juan C. Minano, Pablo Benitez, and W. T. Welford. *Nonimaging Optics*. Amsterdam: Elsevier Academic, (2005), pp. 50-57.

\* cited by examiner

PASSIVE LOUVER-BASED DAYLIGHTING SYSTEM

CROSS-REFERENCE TO RELATED APPLICATION

This application claims priority to and the benefit of U.S. application Ser. No. 13/222,533 filed on Aug. 31, 2011, which claims priority to and the benefit of U.S. Provisional Application Ser. No. 61/413,804 filed on Nov. 15, 2010, both applications are hereby incorporated herein by reference in their entireties.

FIELD OF THE INVENTION

The invention relates generally to window treatment systems and particularly to daylighting systems.

BACKGROUND

Daylighting systems are used to provide natural light to building spaces, reducing the need for electric lighting. Effective use of daylight has several positive benefits including lower energy bills, lower fossil fuel consumption for electricity generation, and increased work environment satisfaction for occupants. An overview of many existing daylighting systems can be found in Ruck et al., *Daylight in Buildings: A Source Book on Daylighting Systems and Components*, a report of the International Energy Agency SHC Task 21/ECBCS Annex 29 (July 2000) and incorporated herein by reference in its entirety.

Anidolic Systems

The search for a static daylighting system that redirects light deeply and also prevents direct sunlight from entering the room at a downwards angle led to the science of non-imaging optics and a technology called the compound parabolic concentrator (CPC). The field of non-imaging, or anidolic, optics was initially used in the development of solar collectors (Scartezzini and Courret, "Anidolic Daylighting Systems," Scartezzini, J.-L. & Courret, G., 2002. Anidolic Daylighting Systems. Solar Energy, 73(2), pp. 123-35.), incorporated herein by reference in its entirety.

The CPC was originally used as a solar concentrator that accepts all light rays from a defined angular extent and concentrates them on a smaller area. The CPC, when used for daylighting applications, uses the same type of reflector profile, but light moves through the profile in the opposite direction. Referring to FIG. 1, based on a figure of a side view of a zenithal anidolic collector from Scartezzini, light enters from all directions through a small inlet aperture and is aligned into a controlled angular range at the outlet. See Scartezzini, Jean-louis, "Anidolic Systems—Non-imaging Transmission of Daylight into Darker Parts of Buildings," EPFL Solar Energy and Building Physics Laboratory LESO-PB/Web 17 Aug. 2010, incorporated herein by reference in its entirety.

A complete discussion of how the CPC works can be found in Winston, Roland, Juan C. Miñano, Pablo Benitez, and W. T. Welford. *Nonimaging Optics*. Amsterdam: Elsevier Academic, (2005), pages 50 though 57, incorporated herein by reference in its entirety. There are four parameters that define the CPC's geometry: inlet size, outlet size, length, and maximum output angle. Setting any two of these parameters will determine the other two and completely define the geometry of the CPC.

Existing anidolic systems, such as the zenithal anidolic collector, were found to have several major shortcomings when applied to an office building setting. For example, since the zenithal anidolic collector allows specular descending rays, the system typically needs to be shaded under sunny conditions to protect from glare. In an open-plan office, blinds that are shut to control glare often remain shut for long periods of time. This problem may only be fully overcome by automating the shading system to eliminate the need for adjustments by the occupants. The physical dimensions of the zenithal anidolic collector are also quite large, approximately 1 to 2 m long and 0.5 to 1 m tall. This size reduces the ceiling height near the facade and makes using the space underneath awkward. Integrating the exterior light scoop can also be an architectural challenge.

Louver Systems

Reflective louvers form another relevant group of daylighting systems. Louver systems are often designed to be located between two panes of glass, making the task of integration into the facade much easier than with larger systems such as the zenithal anidolic collector. Conceptually, louver systems generally consist of a vertical array of identically-shaped curved slats, with a profile that redirects daylight onto the ceiling. The Fish system (U.S. Pat. No. 4,699,467, incorporated herein by reference in its entirety, and also illustrated in Ruck, page 4-24), shown in FIG. 2, is one such louver system. Although it is able to redirect all incoming light above horizontal, it does a relatively poor job of collimating the output light. As a result, light from these louvers may not penetrate as deeply as desired.

Compagnon evaluated a reflector system comprised of anidolic profiles, as shown in FIG. 3. See p. 138, FIG. 5.47 of Compagnon, R., Simulations Numeriques de Systemes D'Eclairage Naturel a Penetration Laterale. PhD Thesis. Lausanne: Ecole Polytechnique Federale de Lausanne, 1994, incorporated herein by reference in its entirety. The inner anidolic curves are tilted upwards so that light exiting the reflectors may be directed onto the ceiling, to protect from glare. The idea of using anidolic profiles to compose a louver array is an attractive one. However, in this configuration the design of the outer half of the louver results in the rejection of all light above a projected elevation angle of 60°. Light enters the room at a maximum of 60° above horizontal, which is a lower maximum elevation angle than that of the Fish Louver. However, the output elevation range is still fairly wide and the amount of light traveling deeply into the space may be limited as a result. The lower curve of the CPC profile is truncated in this design, meaning that the louvers will spill light below horizontal, potentially causing glare. Also, although it is more compact than the zenithal anidolic collector, the size of the assembly is still rather bulky at 0.48 m depth.

Referring to FIGS. 4a and 4b, the CPC was incorporated into another louver system developed by Eames and Norton (Eames, P. & Norton, B., 1994. A Window Blind Reflector System for the Deeper Penetration of Daylight into Room Without Glare. International Journal of Ambient Energy, 15(2), pp. 73-77, incorporated herein by reference in its entirety. As with Compagnon's design, light enters the louver array through a skyward tilted CPC, and is guided therethrough as shown in FIGS. 4a and 4b, i.e., FIGS. 1 & 2 of Eames et al., which include a graph of ray tracing through the profile. However, Eames and Norton's design has an asymmetric anidolic louver profile, in which the inner half of the louver is composed of a flat section and a circular section, rather than another CPC.

These inner surfaces of the Eames and Norton design may raise several issues that may make this design problematic. For example, the louvers are spaced such that sunlight can pass directly through without being redirected. Also, light is able to reflect off the outer CPC and enter the room at a downward angle. Both of these effects have the potential to cause glare under direct sunlight. The output elevation angle ranges up to 90°, which means that a large portion of the light hits the ceiling immediately adjacent to the facade without travelling very far into the space. The inner flat surface of this louver is diffuse, so light hitting it may be scattered in all directions, further limiting the louver's ability to guide light to the back of the space. Finally, the CPC inlet section rejects light with an elevation angle above 65°, for light normal to the facade in azimuth. As the azimuth angle of the light increases, this cut-off angle drops from 65° down to 0°, for light nearly parallel to the facade. As a result, the system is not able to transmit light from a large portion of the sky. The lower portion of the sky from which the system does successfully pass light is also the first to be blocked by surrounding sky obstructions. Additional attempts were made to incorporate anidolic geometry into a louver array, as shown in FIG. 5, which illustrates additional anidolic louver designs. See FIG. 3 on page 3 of Courret, G., Paule, B. & Scartezzini, J.-L., 1994. Application de l'Optique Anidolique a l'Eclairage Naturel Lateral d'un Nouveau Baitment. In Wärmeschutz Conference. Zurich, 1994, incorporated herein by reference in its entirety.

These designs have some intriguing features but, ultimately, may not be suitable for a deep-plan space. The first two images show the same design at different scales. These louvers collimate light into a very narrow range around horizontal, but since the anidolic curves are not tiled towards the ceiling, approximately half of the light will exit below horizontal. This may be acceptable for a shallow office with a depth 3 or 4 m, but it would likely cause disturbing glare in deeper spaces. Another drawback with this design is that a large fraction of the incoming light is rejected by the steeply inclined plane at the louver's inlet. Finally, the very long and slender shape of the louver may be difficult to produce accurately, especially at the scale contemplated in the middle image. The intent of the rightmost system in the image is to reject high-angle light while admitting low-angle light. This design allows light to exit at a downward angle as well, meaning that all the variants shown in FIG. 5 would likely require an additional shading system if exposed to direct sun.

Referring to FIG. 6, another, more recent, entry into the reflective louver category which does not incorporate a CPC profile is called the LightLouver (U.S. Pat. No. 6,714,352, incorporated herein by reference in its entirety). See also "Information." *LightLouver Daylighting System Homepage*. LightLouver LLC. Web. 18 Aug. 2010, incorporated herein by reference in its entirety. This louver is able to collimate the output light closer to horizontal so that light generally penetrates more deeply than with the other systems discussed. However, there are several downsides worth noting. First, the LightLouver system allows low elevation angle sunlight (5° or less) to enter the room at a downward angle. This may or may not be a problem depending on the circumstance of a particular installation site. Second, the entire exterior-facing surface of the louver is a diffusing surface, which rejects a large fraction of the total incoming daylight, leaving less to distribute into the room. This exemplifies a recurring tradeoff seen in louver systems between the amount of light rejected by the louver and the extent of the emitted light's angular range. Finally, the width-to-height ratio of the LightLouver is rather large at 2.75 (Rogers et al., 2004). More louvers would be required to fill an equivalent window opening than with a design with a smaller aspect ratio.

Static and Dynamic Systems

In general, daylighting systems may be divided into two categories: passive and dynamic. Passive systems are fixed and contain no moving parts. Dynamic systems contain moving parts, which are usually used to track the sun as it moves across the sky.

Since they have no moving parts, passive systems are generally less expensive and require less maintenance than dynamic systems. However, passive systems are typically only effective for a limited range of sun and sky conditions. Moreover, they may at times, allow direct sun to pass through unimpeded, causing glare. As a result, a separate shading system is typically required, which may lead to additional problems resulting from suboptimal control of the shading system.

Dynamic systems are typically used to respond to the dynamic nature of the sun. A common example is the venetian blind, whose slats can be adjusted, manually or automatically, in response to different insolation conditions. When automated, these systems are typically more expensive in both upfront and maintenance costs than their passive counterparts because they require rotating machinery, an accurate control system, and human monitoring. Another limitation is that since most dynamic systems are designed to use the sun's radiation as input, their effectiveness is severely reduced under overcast conditions. In cloudy climates, it may be difficult to justify the additional expense of a sun-tracking dynamic system.

SUMMARY

A new louver system, incorporating, inter alia, a CPC profile, improves upon or eliminates the drawbacks of both the anidolic and louver systems described above.

Embodiments of the daylighting system of the invention are suitable for buildings with deep open-plan spaces, commonly found in office buildings. The daylighting system takes both direct sunlight and diffuse skylight and directs it into the room at an angle near horizontal, which allows the light to penetrate deeply. The system is designed to diffuse direct sunlight to reduce glare.

The compact design, including features that prevent direct sun penetration, of the described system provide advantages over existing systems. For example, the LightLouver discussed above has a larger width-to-height ratio than the louver described herein (typically 2.75, in contrast to 2.32 in one preferred embodiment of the invention). Consequently, for a given glazing unit width and height, approximately 19% more individual LightLouvers would be required to fill the space, in comparison to the louver of embodiments of the invention. In addition, the LightLouver allows direct sun penetration at low elevation angles between 0-5°, a potential source of glare. In various embodiments, the new louver does not allow undiffused direct sun penetration in a downward direction for any angle of incoming light.

The system, in accordance with embodiments of the invention, has the potential to bridge the gap between automated systems that are expensive and maintenance-intensive and passive systems that can be ineffective and/or cause glare for significant parts of the year. The system is simple, passive, and maintenance free. It is also well suited for both sunny and cloudy conditions without requiring any reconfiguration.

The daylighting system described herein may be used in any building space with a facade that faces east, south, or west. (or, in the southern hemisphere, the north, east, or west). The daylighting system is suitable for office buildings, since office buildings are typically occupied during daylit hours and often have deep-plan layouts, for which the system is designed. For spaces which are not as deep, the length of the reflective ceiling may be reduced or eliminated to minimize cost. The system can be installed in new buildings and as a retrofit to existing buildings. For organizations that are interested in owning or occupying green buildings, the daylighting system is an attractive option.

In an aspect, an embodiment of the invention includes a daylighting system for use in a building including a louver array having a first longitudinal element, and a second longitudinal element spaced therefrom. At least one of the first and second elements has an asymmetrical profile, each of the first and second longitudinal elements has a bottom profile including a parabolic surface, portions of opposing surfaces of the first and second longitudinal elements define a compound parabolic concentrator profile, a centerline of the compound parabolic concentrator profile is non-horizontal and is tilted upwards, and the array prevents line of sight therethrough.

One or more of the following features may be included. The first element may have a generally triangular profile. The triangular profile may include a leading edge, a trailing edge, and an apex therebetween. The apex may be disposed in a downward direction from the leading and trailing edges. An upper surface formed between the leading edge and the trailing edge may have a discontinuous contour, such as a pair of arcuate surfaces meeting at a boundary line. An inlet surface formed between the leading edge and the apex may include a planar surface. An outlet surface formed between the apex and the trailing edge may include an arcuate surface. At least a portion of the first element may include a partially specular reflective surface.

A channel formed between the first louver element and the second louver element may include an entry aperture, inlet aperture, a throat, and an exit aperture. The entry aperture may span respective leading edges of the first element and the second element. The inlet aperture may span an apex of the first element and an upper surface of the second element.

The exit aperture may span respective trailing edges of the first element and the second element. A half-width of the exit aperture may be equal to a half-width of the inlet aperture divided by sine $\theta_{max}$, with $\theta_{max}$=a maximum output angle of the channel. A boundary line may be disposed downstream of the throat.

The first element and the second element may have a common profile and/or may be vertically aligned. Output elevation angles of a majority of light rays exiting the daylighting system may be selected from a range of 0° to $2\times\theta_{max}$, with $\theta_{max}$=a maximum output angle of a channel formed between the first longitudinal element and the second longitudinal element. A minimum reflectance of at least one of the first and second longitudinal elements may be 50% luminous reflectivity.

The daylighting system may include a first glazing, with the first and second elements being disposed proximate the first glazing. The daylighting system may also include a second glazing, with the first and second elements being disposed between the first glazing and the second glazing.

A refractive element may be disposed proximate the first and second longitudinal elements and between the first glazing and the second glazing. The refractive element may include or consist of a plurality of refractive rods.

A reflective ceiling may be disposed proximate the first and second longitudinal elements. The reflective ceiling may have a minimum reflectance of at least 50% luminous reflectivity.

In another aspect, embodiments of the invention include a louver for a daylighting system. The louver includes a leading edge defined by a parabolic concentrator surface, a flat surface, and a leading connecting surface disposed between the parabolic concentrator surface and the flat surface. The louver also includes a trailing edge defined by a lower compound parabolic concentrator profile, an upper compound parabolic concentrator profile, and a trailing connecting surface disposed between the lower compound parabolic concentrator profile and the upper compound parabolic concentrator profile.

In yet another aspect, embodiments of the invention include a method for designing a louver profile. The method includes creating a compound parabolic concentrator profile, having (i) a lower profile equal to a negative of an upper profile, and (ii) ends of the lower and upper profiles defining a large aperture and a small aperture, the large aperture being disposed downstream of the small aperture. The compound parabolic concentrator profile is rotated counterclockwise by a maximum output angle $\theta_{max}$. A parabola with a vertical axis of symmetry is added using an upstream end of the upper profile as a focus and an upstream end of the lower profile as a point on the parabola. The upper profile is moved vertically downwards below the lower profile to form a small gap between downstream edges of the upper and lower profiles. A line connecting the downstream ends of the upper and lower profiles is added to define a trailing edge. A line starting from an upstream end of the lowered upper profile is added, with the line ending at the parabola.

DETAILED DESCRIPTION

Figure 1:
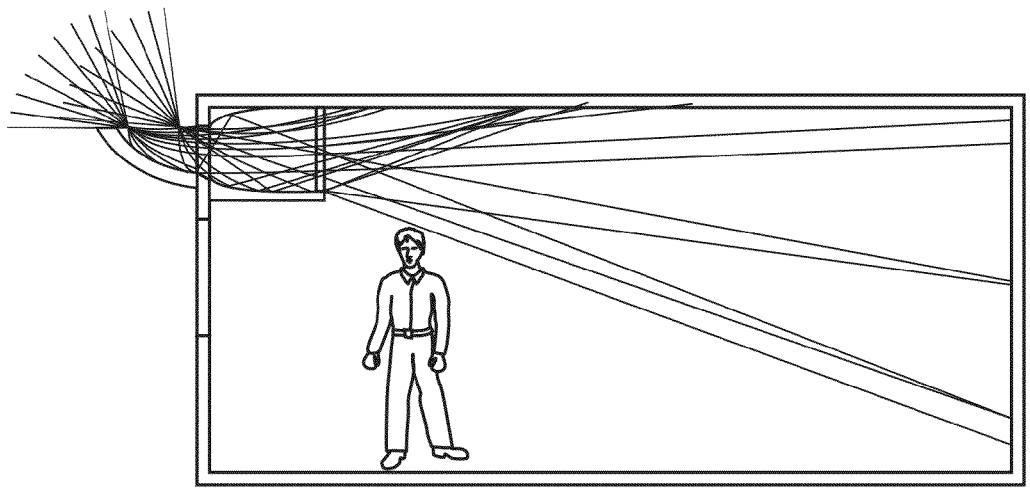
FIG. 1 is a side view of a zenithal anidolic collector system of the prior art.
Figure 2:
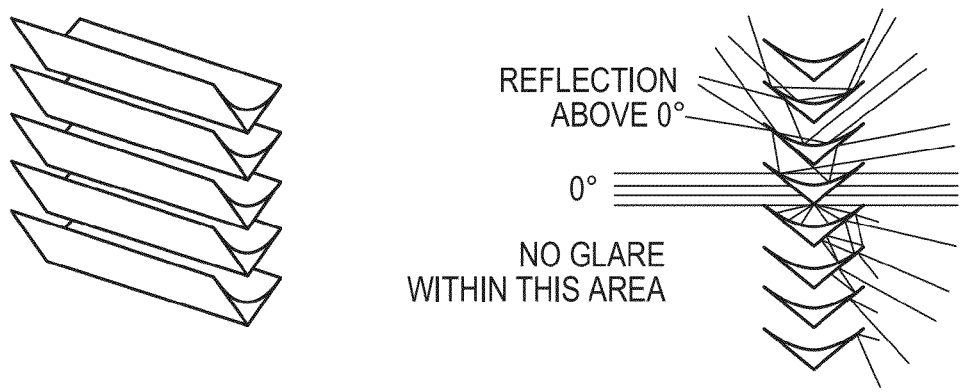
FIG. 2 is a diagram of a Fish louver cross section of the prior art.
Figure 3:
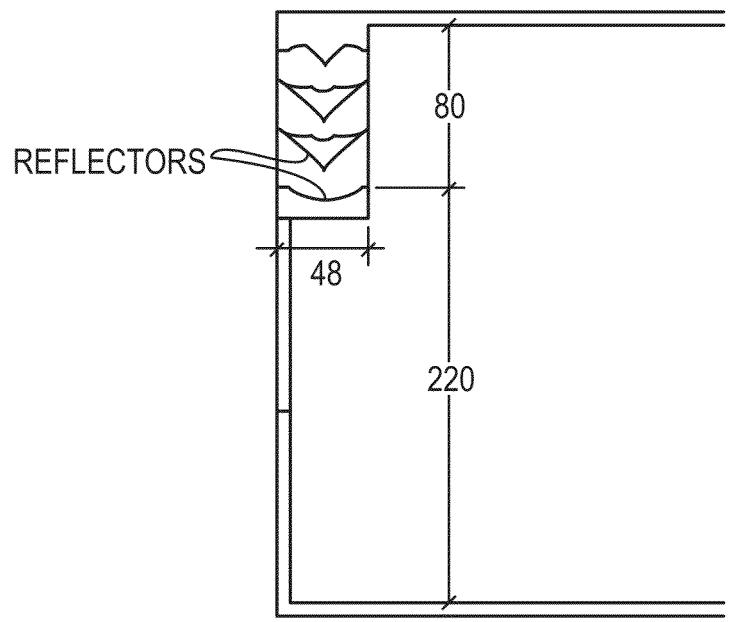
FIG. 3 is a diagram of anodolic louvers of the prior art.
Figure 3:
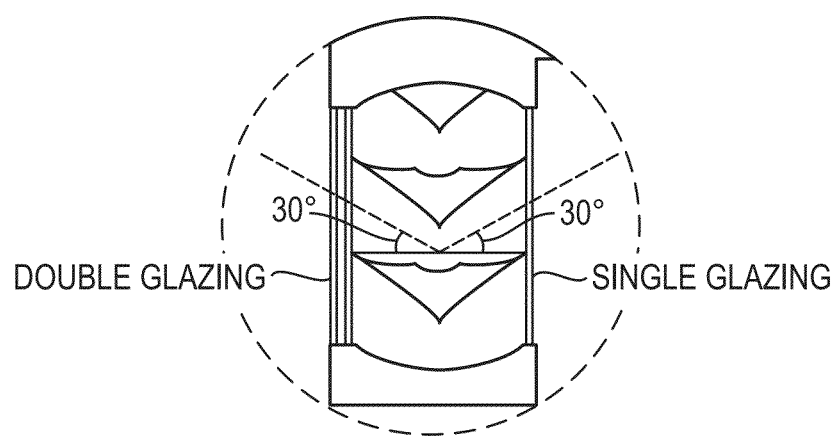
Figure 4A:
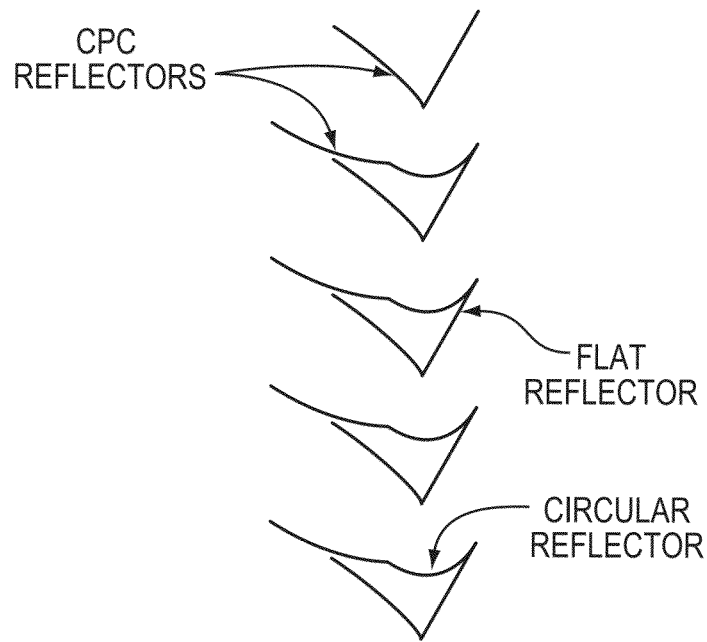
FIGS. 4a and 4b are diagrams of an asymmetric anadolic louver profile of the prior art, and ray tracing through the profile.
Figure 4B:
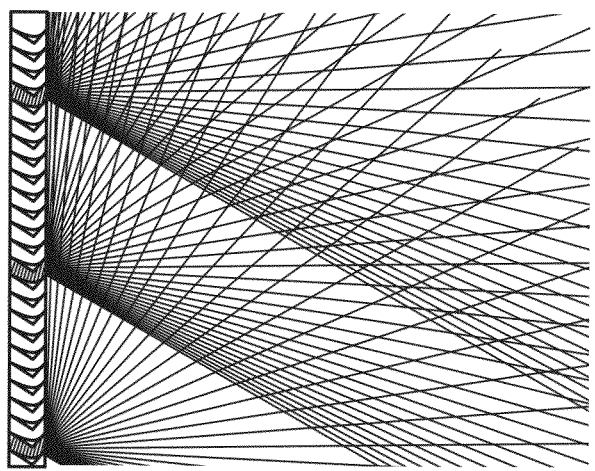
Figure 5:
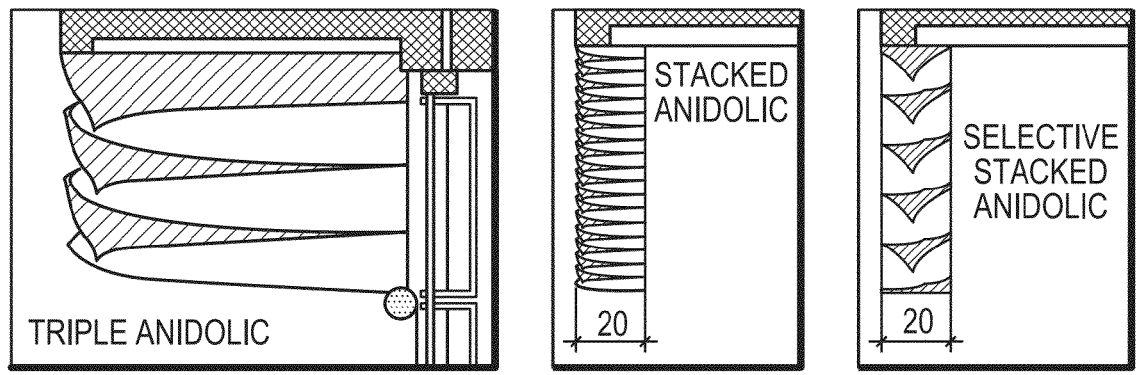
FIG. 5 is a diagram of additional anidolic louver designs of the prior art.
Figure 6:
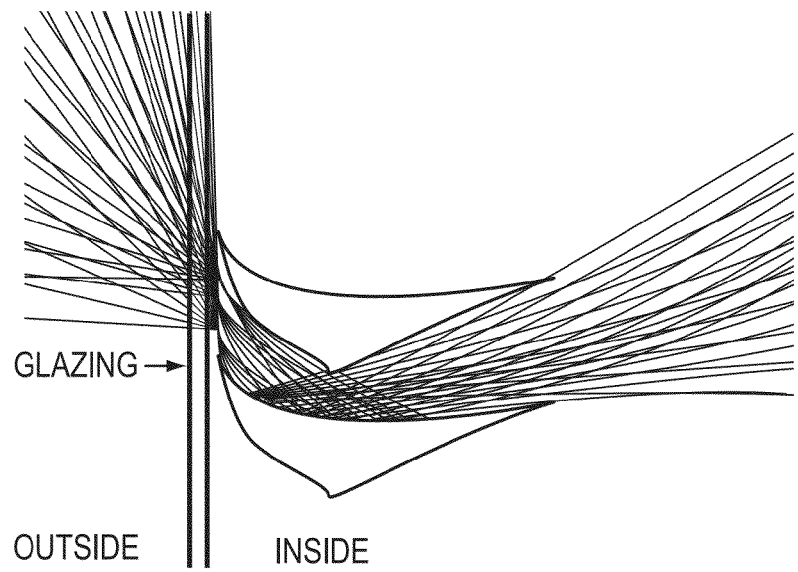
FIG. 6 is a diagram of a LightLouver cross section of the prior art, as illustrated in U.S. Pat. No. 6,714,352.
Figure 7:
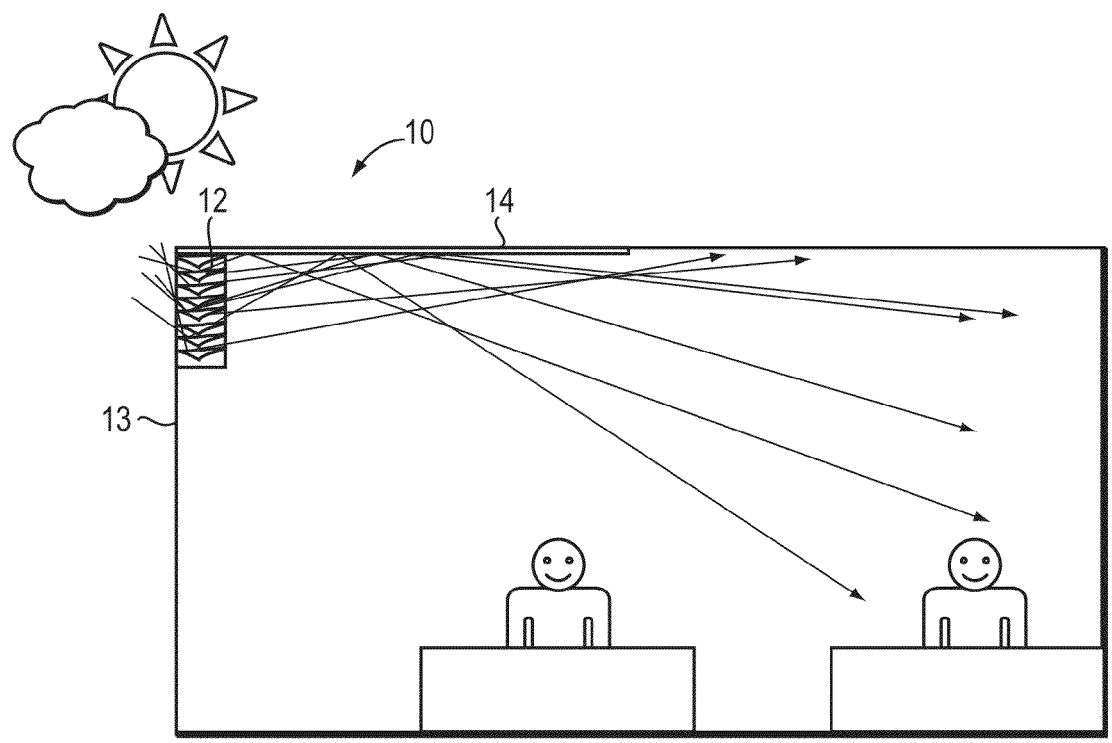
FIG. 7 is a schematic diagram of an entire daylighting system in accordance with an embodiment of the invention.
Figure 8:
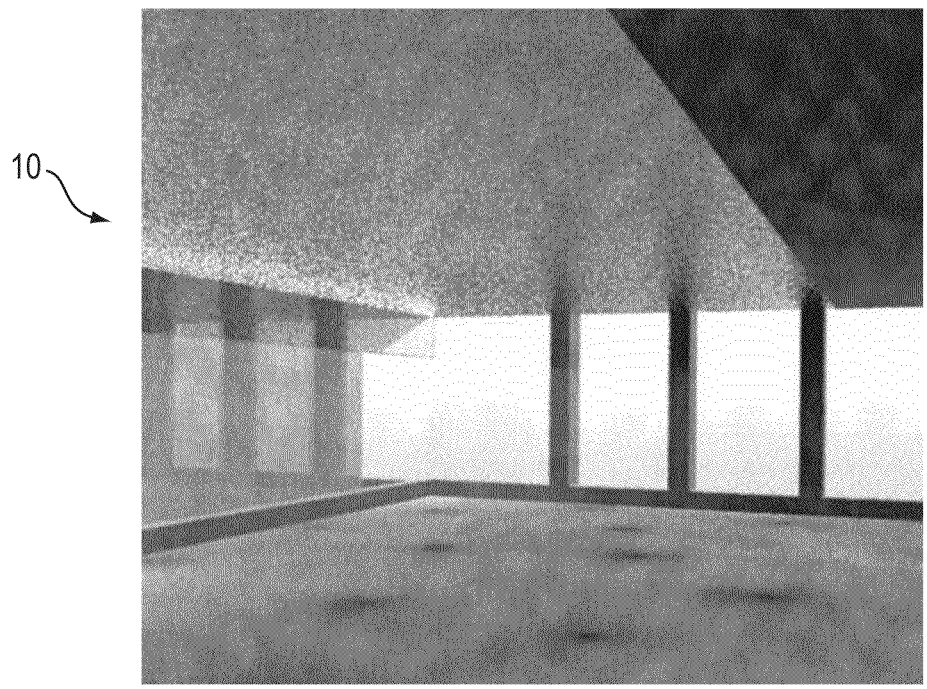
FIGS. 8 and 9 are illustrations of the system disposed in an office space equipped with one embodiment of the invention.
Figure 9:
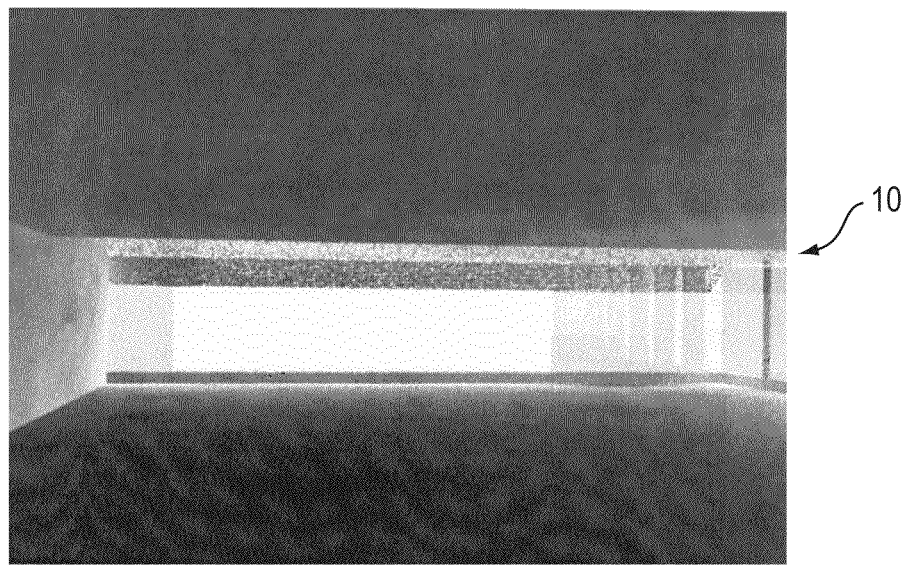

Referring to FIGS. 7-9, an embodiment of the daylighting system 10 of the invention includes three major subassemblies. Two of these subassemblies, the reflective louvers and refractive rods, discussed in detail below, are housed in a window unit 12 installed at the top of the daylit facade 13. The other subassembly includes a reflective ceiling 14. The reflective ceiling 14 may be achieved with reflective panels that cover the ceiling from the daylit facade 13 to a distance of 4 to 6 m inboard (the distance required will vary based on room size and performance goals). More specifically, FIG. 7 is a cross-sectional diagram of a proposed daylighting system 10 installed in an office. FIGS. 8 and 9 are renderings of the system 10 from inside the office space.

Figure 10:
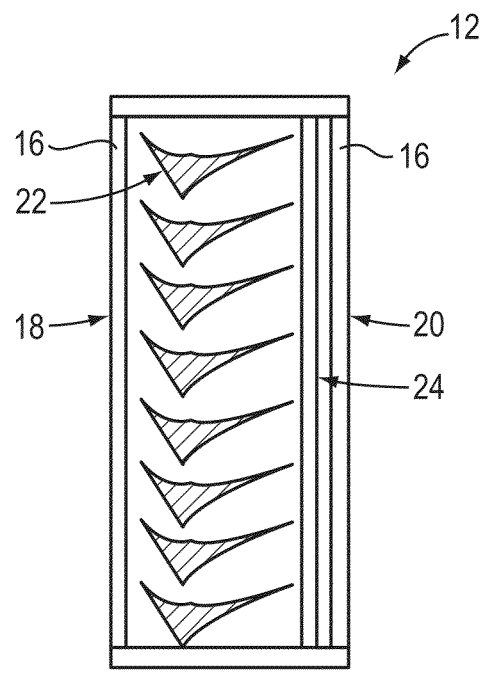
FIGS. 10 and 11 are cross-sectional diagrams illustrating window units formed in accordance with embodiments of the invention.
Figure 11:
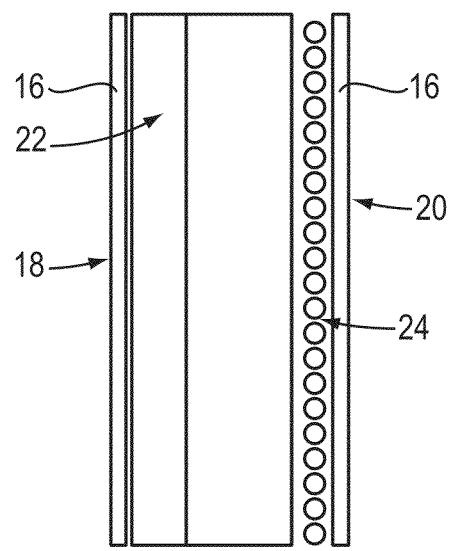

FIGS. 10 and 11 are side view cross-section and top view cross-section, respectively, of the window unit 12, in accordance with an embodiment of the invention. The window unit 12 contains two glass panes 16, similar to a standard double glazed window unit. The glass panes 16 include a first or outer glazing 18 and a second or inner glazing 20. Disposed between the outer and inner glass panes 16 is an optical device including reflective longitudinal elements 22, also referred to herein as louvers 22, and refractive rods 24, as discussed below. Both the louvers 22 and refractive rods 24 are sensitive to dust and scratching. Placing them inside the window unit 12 helps provide protection and eliminates or reduces maintenance.

To protect occupants from glare, there is no view through the window unit 12 to the outdoors. The bottom of the unit 12 is preferably no lower than approximately 2.1 m off the floor to allow for a view window on the lower portion of the facade 13.

Louver Design

Figure 12:
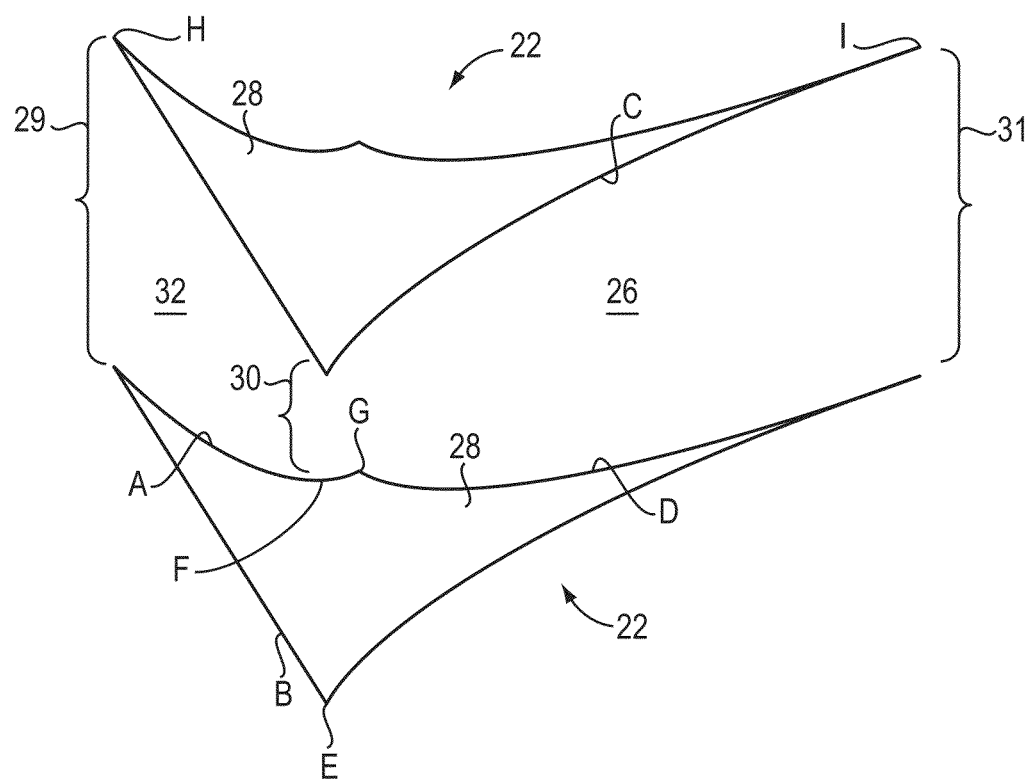
FIG. 12 is a schematic diagram illustrating features of a louver pair in accordance with an embodiment of the invention.

The functionality of the louver 22 in accordance with embodiments of the invention shall now be described. To understand how the louver system works, it helps to consider the geometry of a channel 26 that is created between first and second longitudinal elements, i.e., two louvers 22. Four surfaces A, B, C, and D of a first and a second louver 22 define this channel 26, as shown in FIG. 12. Taken together, surfaces A, C, and D form a louver profile 28 or cross-section of a longitudinal element similar to the zenithal anidolic collector daylighting system. As depicted in FIG. 12, the louver profile 28 is asymmetric. In some embodiments, the profile 28 is constant along a longitudinal direction or extant of the louver 22.

The profile 28 described here is the ideal shape, with the profile 28 coming to a sharp point at either end (i.e., at leading and trailing edges). As depicted, the profile 28 of the louver 22 includes a leading edge (point H), a trailing edge (point I), and an apex (point E). In some preferred embodiments, in view of manufacturing capabilities, the profile 28 does not include a sharp end at the leading edge and/or the trailing edge; rather the profile 28 may have leading and trailing connecting surfaces at these locations, with a larger minimum thickness. For example, a leading connecting surface may connect Surface A and Surface B at point H, and a trailing connecting surface may connect Surface C and Surface D at point I.

Surface A

Figure 13:
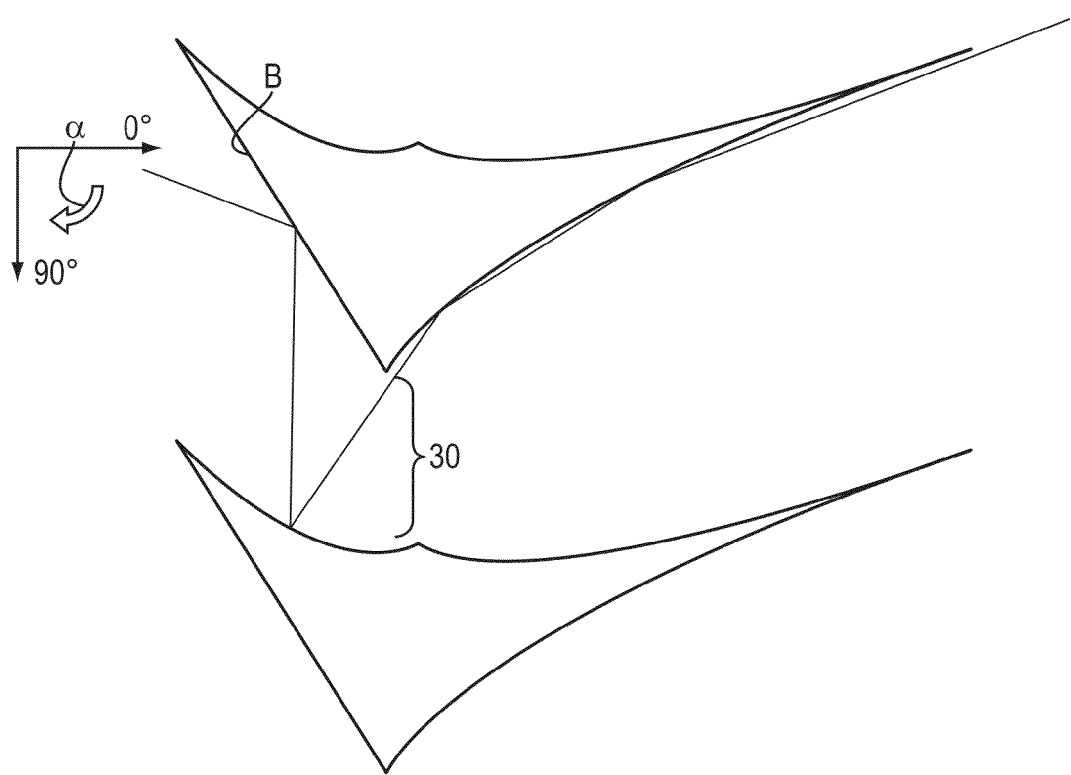
FIG. 13 is a schematic diagram illustrating the definition of the elevation angle.
Figure 14A:
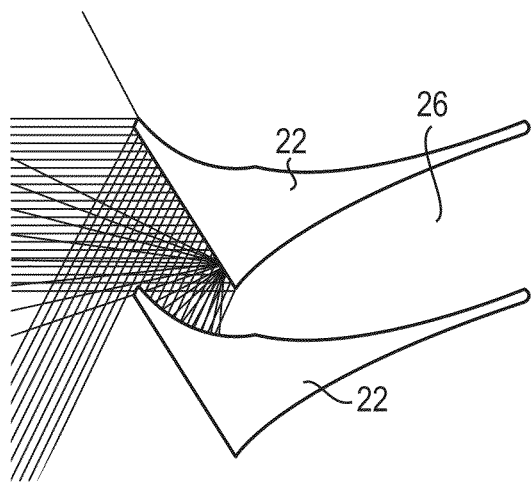
FIGS. 14a-14j illustrates ray tracing through louvers for varying incoming elevation angles.
Figure 14B:
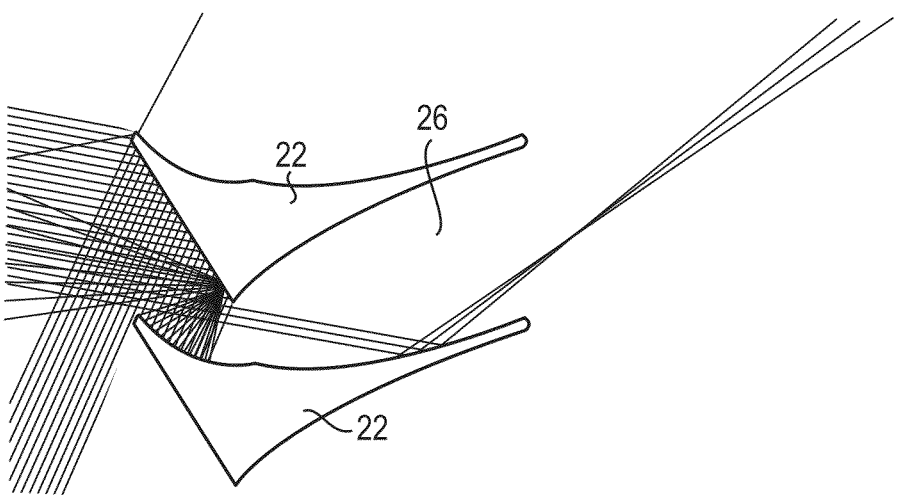
Figure 14C:
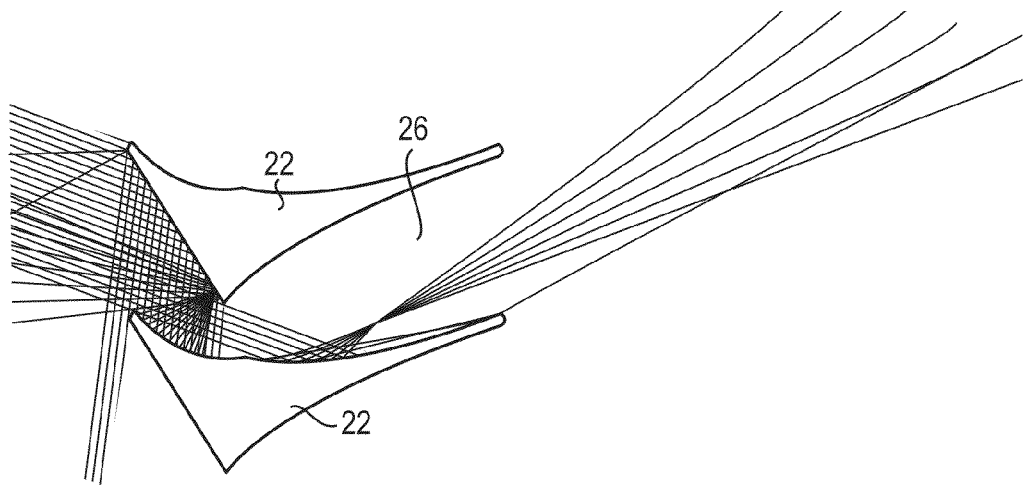
Figure 14D:
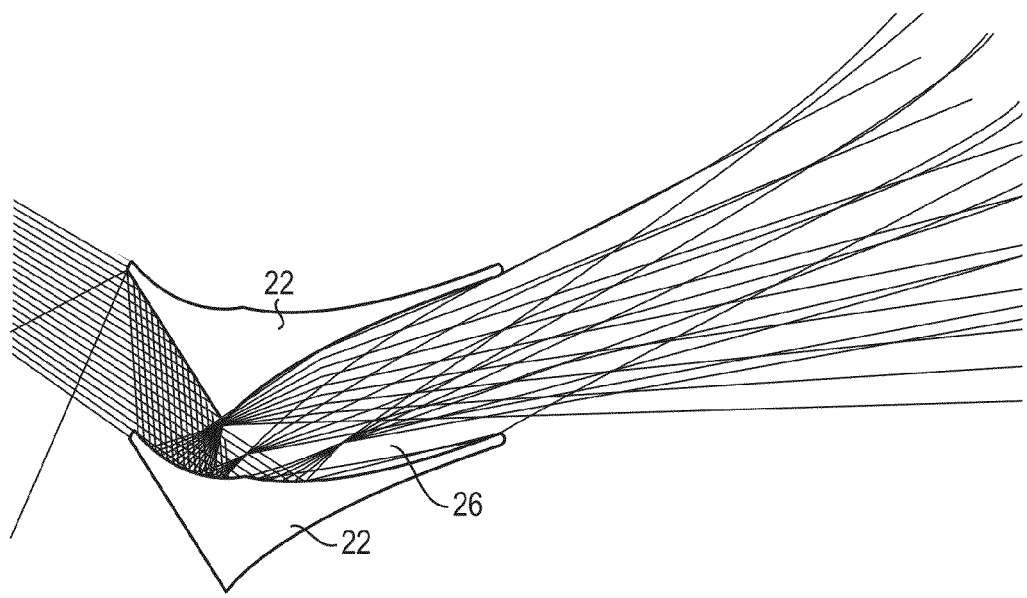
Figure 14E:
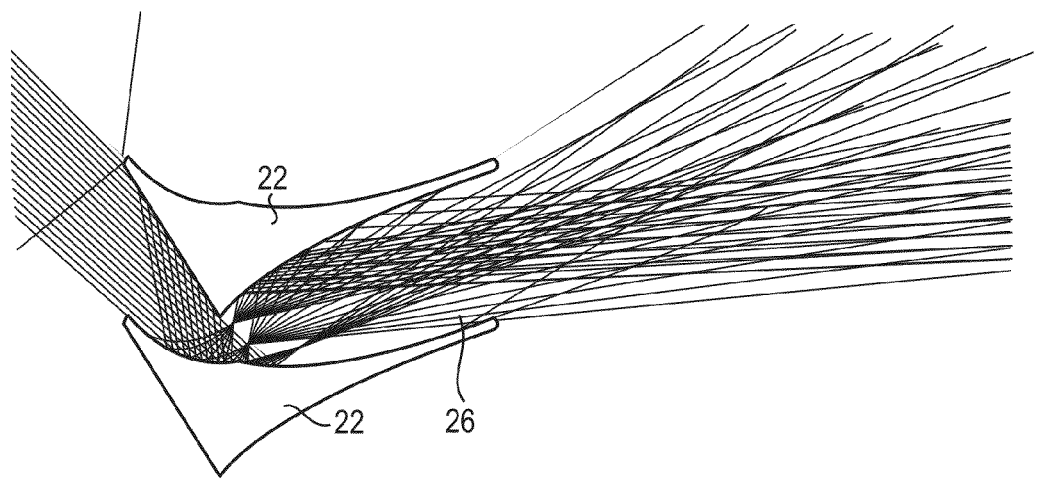
Figure 14F:
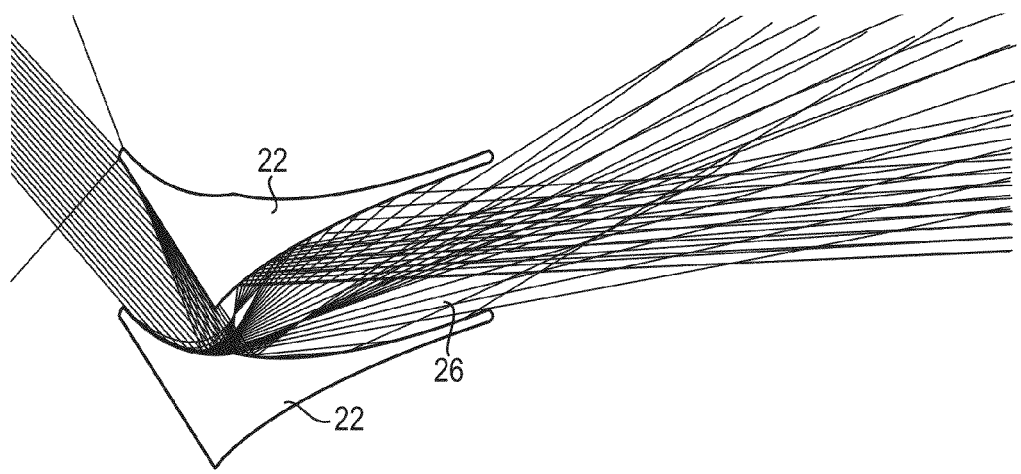
Figure 14G:
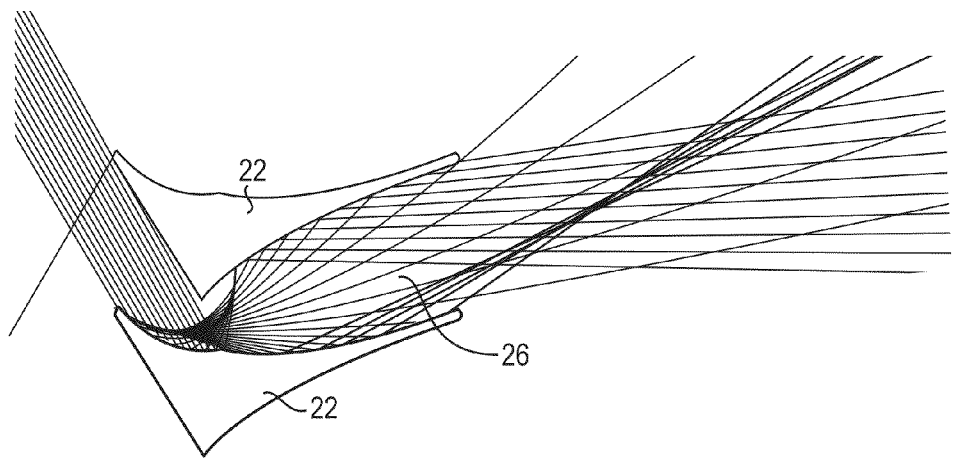
Figure 14H:
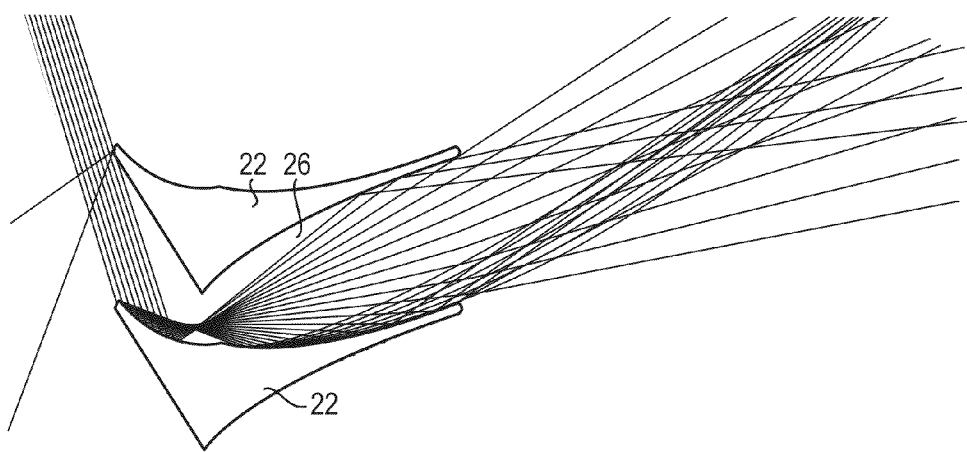
Figure 14I:
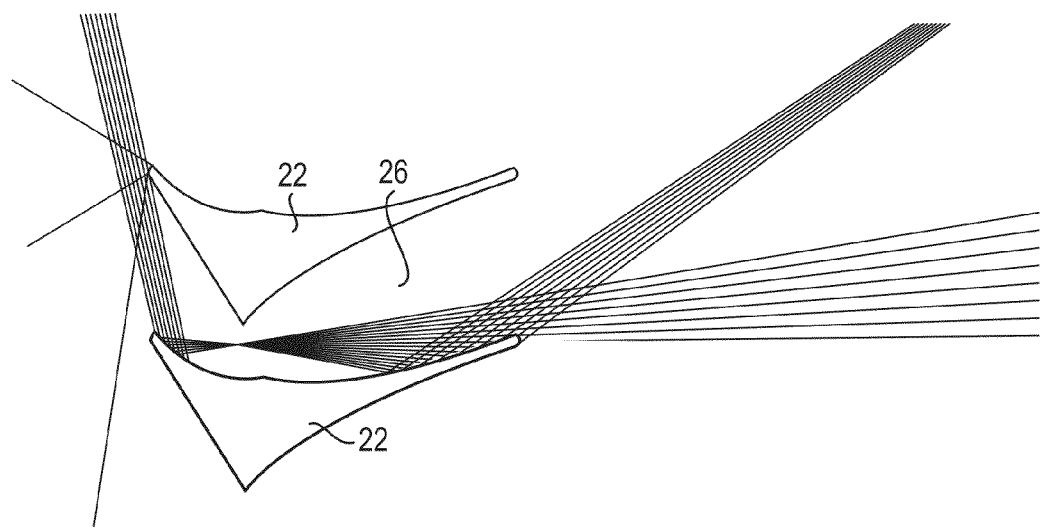
Figure 14J:
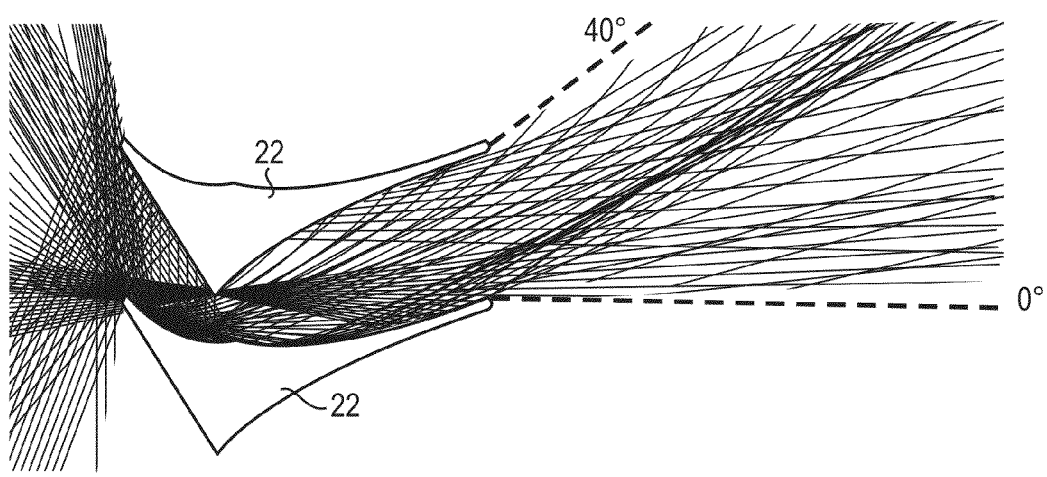

Surface A is a parabolic reflector or parabolic concentrator surface, whose purpose is to collect incident light that passes through an entry aperture 29 and ensure that the light is bounced through a small inlet aperture 30. The nature of the parabolic profile ensures that any light ray that strikes the parabola with an elevation angle $\alpha$ less than or equal to 90° will successfully pass through the inlet aperture 30. In other words, the ray is preferably moving toward, rather than away from, a louver exit aperture 31 when it hits surface A to successfully pass through the channel 26. FIG. 13 shows the definition of the elevation angle $\alpha$ and an example of a ray with an elevation angle $\alpha$ of 90°, after it reflects off of surface B, and just makes it through the inlet aperture 30. As depicted in FIG. 12, this effect occurs because the vertex of the parabola (point F) is located directly underneath the focus (point E) at the proper distance so that the curve of the parabola intersects the end of surface D (point G). Point E may be referred to as an apex. A region between the entry aperture 29 and the inlet aperture 30 may be referred to as a throat 32. A boundary line is located at point G and extends along a longitudinal direction of the louver 22. The longitudinal direction is normal or perpendicular to the louver profile 28 depicted in FIG. 12. Surfaces A and D, taken together, form a discontinuous contour, with a pair of arcuate surfaces meeting at the boundary line.

This design differs from that of a standard zenithal anidolic collector system. With the zenithal anidolic collector, the CPC (surfaces C and D) is not tilted upwards as it is in this louver design. A result of this is that for the zenithal anidolic collector, the end of surface D would be located directly underneath the end of surface C. For the zenithal anidolic collector, the vertex of the parabolic light scoop (surface A) is simply located at point F, and the resulting profile for surface A is exactly half of a full parabola. However, in the case of the louver 22, the end of surface D (point G) does not fall directly underneath the end of surface C (point E). In a preferred embodiment, the vertex of surface A (point F) is kept directly underneath the end of surface C (point E). The parabolic profile of surface A is defined so that its focus is located at the end of surface C (point E) and so that it also intersects the end of surface D (point G). This choice of profile increases the distance from the parabola's vertex to focus, which reduces how steeply the parabola curves upwards. This is important because the steeper the curve of the parabola, the more low angle light is rejected since surface B then needs to be tilted at a steeper angle to intersect with the steeper parabola.

Surface B

Surface B is the simplest of the four louver surfaces, as it is planar rather than curved. Conceptually, its purpose is analogous to that of the backboard of a basketball goal. Incoming light that bounces off surface B is redirected toward surface A. As long as the reflected ray leaves surface A at an elevation angle $\alpha$ less than or equal to 90°, it will strike the parabola of surface A and enter the inlet aperture 30 (refer to FIG. 13 for an example of such a ray). Without surfaces A and B, only a fraction of the light hitting the facade 13 may enter the inlet aperture 30, as the rest may be lost in the interstitial spaces between inlet apertures.

As mentioned above, the angle of surface B controls how efficiently low angle light is allowed to pass through the louvers 22. Ideally, the angle of surface B with respect to horizontal is 45° so that horizontal light is reflected off surface B directly downwards onto surface A. In that case, any incoming light with an elevation angle $\alpha$ of 0° or greater successfully passes into the inlet aperture 30.

Preferably, the angle of surface B is as close to 45° as possible to increase the amount of low angle light that successfully passes through the louver channel 26. Surface B needs to connect with the parabola of surface A to complete the louver profile 28. At 45°, however, surface B may not intersect surface A. At a theoretical minimum angle, surface B is tangent to surface A. If a louver 22 is defined with the angle of surface B being equal to the theoretical minimum angle, the leading edge may be excessively long and thin, thereby possibly becoming too fragile, and, more importantly, increasing a width to height ratio of the louver 22 to an extent which may be difficult to house in a glazing unit. Moreover, this increase in size may not provide significant benefits in terms of passing of low angle light. Therefore, the angle of surface B is preferably greater than the theoretically minimum angle. In an embodiment, the theoretical minimum angle may be 55°, and the selected angle of surface B may be 58°.

In the embodiment of the louver design described here, the angle of surface B with respect to horizontal was chosen to be 58°, rather than 45°. This increase in angle allows surfaces A and B of the same louver to intersect at point H. As a result, the majority of light rays incoming at less than approximately 26° (=2 times the difference between 58° and) 45°, referred to as the cut-off angle, are rejected by the outer half of the louver 22.

With this type of louver design, there is a direct correlation between the allowable range of output angles and the cut-off angle. The tighter the output light's angular range, the higher is the cut-off angle. For an urban setting, the impact of losing light from near the horizon is less significant than it otherwise may be because the urban surroundings often block the view to the bottom portion of the sky. For light rays that are not perpendicular to the facade 13, the projected elevation angle is increased, meaning that a significant portion of light coming in at less than a 26° angle also passes through the louvers 22 successfully.

Surfaces C and D

The profiles of surfaces C and D are governed by the equations found on page 51 of the book *Nonimaging Optics*. In an embodiment, the maximum output angle for the chosen design was 20°. This means that all light exiting the louvers is typically within plus or minus 20° of the centerline of the CPC. 20° was chosen as a compromise between the competing factors of the angular range of exiting light and the cut-off angle. The CPC surfaces are tilted upwards by 20° to prevent them from allowing downward traveling rays which may cause glare when exposed to direct sun. Consequently, the output range for the louvers in this embodiment is between 0 and 40° above horizontal, regardless of the incoming direction of the light.

Ray Paths Through the Louvers

FIGS. 14a-14j show how incoming rays at different positions and elevation angles are redirected by the louvers 22. In particular, the figures indicate ray tracing through louvers for the following varying elevation angles: 0° (a), 10° (b), 20° (c), 30° (d), 40° (e), 50° (f), 60° (g), 70° (h), 80° (i), and superposition of all angles (j). Light travels from left to right in the images. Notice that of all the ray paths traced in the images, none exits the louver channel 26 at an angle less than 0° above horizontal. The images also illustrate how some low-angle incoming light is rejected by the louver inlet and bounces back outside.

A natural question that arises is: what happens to rays that are out of plane, rather than in plane, with the louvers' cross-section? On this matter, Winston et al. explain that > the ray tracing in any 2D trough-like reflector is simple even for rays not in a plane perpendicular to the length of the trough. This is because the normal to the surface has no component parallel to the length of the trough, and thus the law of reflection can be applied in two dimensions only. The ray direction cosine in the third dimension is constant. Thus, if [a diagram] shows a 2D CPC with the length of the trough perpendicular to the plane of the diagram, all rays can be traced using only their projections on this plane (pages 53-54).

Based on this understanding, if the 2D ray path diagrams show that for any incoming ray direction no rays are directed downwards at the outlet, the same will be true for any incoming ray direction in 3D as well.

Figure 15:
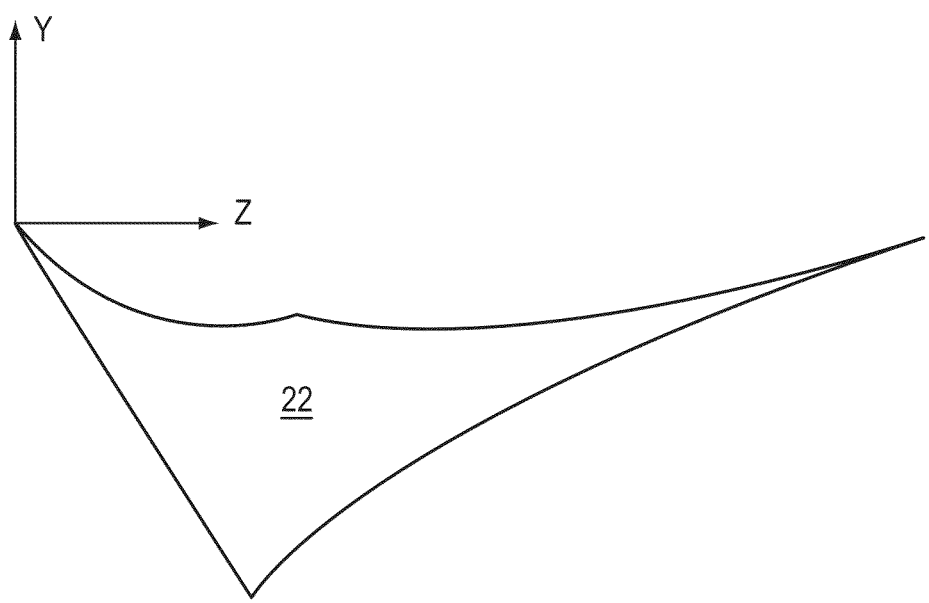
FIG. 15 illustrates the definition of the coordinate system.

The series of coordinates that define the shape of a particular embodiment of the louver 22 are as follows. Since the shape of the louver 22 is quite complicated, the simplest way to define it is by a series of coordinates along its surface. Using a CAD program, a spline curve can be drawn connecting the points and accurately reproducing the shape. FIG. 15 defines the coordinate system used and Table 1 lists the coordinates.

TABLE 1

Louver Profile Coordinates

| Point # | X | Y |
|---|---|---|
| 1 | 0.0000 | 0.0000 |
| 2 | 0.0122 | −0.0126 |
| 3 | 0.0244 | −0.0249 |
| 4 | 0.0366 | −0.0368 |
| 5 | 0.0468 | −0.0485 |
| 6 | 0.0610 | −0.0599 |
| 7 | 0.0732 | −0.0710 |
| 8 | 0.0654 | −0.0816 |
| 9 | 0.0976 | −0.0923 |
| 10 | 0.1098 | −0.1025 |
| 11 | 0.1220 | −0.1124 |
| 12 | 0.1341 | −0.1220 |
| 13 | 0.1463 | −0.1313 |
| 14 | 0.1585 | −0.1403 |
| 15 | 0.1707 | −0.1490 |
| 16 | 0.1829 | −0.1574 |
| 17 | 0.1951 | −0.1655 |
| 18 | 0.2073 | −0.1734 |
| 19 | 0.2195 | −0.1809 |
| 20 | 0.2317 | −0.1880 |
| 21 | 0.2439 | −0.1950 |
| 22 | 0.2561 | −0.2016 |
| 23 | 0.2683 | −0.2709 |
| 24 | 0.2805 | −0.2140 |
| 25 | 0.2927 | −0.2197 |
| 26 | 0.3049 | −0.2251 |
| 27 | 0.3171 | −0.2302 |
| 28 | 0.3293 | −0.2351 |
| 29 | 0.3415 | −0.2396 |
| 30 | 0.3537 | −0.2439 |
| 31 | 0.3659 | −0.2479 |
| 32 | 0.3780 | −0.2515 |
| 33 | 0.3902 | −0.2549 |
| 34 | 0.4024 | −0.2579 |
| 35 | 0.4146 | −0.2607 |
| 36 | 0.4268 | −0.2631 |
| 37 | 0.4390 | −0.2653 |
| 38 | 0.4512 | −0.2671 |
| 39 | 0.4634 | −0.2687 |
| 40 | 0.4756 | −0.2700 |
| 41 | 0.4878 | −0.2710 |
| 42 | 0.5000 | −0.2716 |
| 43 | 0.5122 | −0.2720 |
| 44 | 0.5244 | −0.2721 |
| 45 | 0.5366 | −0.2719 |
| 46 | 0.5486 | −0.2713 |
| 47 | 0.5610 | −0.2705 |
| 48 | 0.5732 | −0.2695 |
| 49 | 0.5854 | −0.2680 |
| 50 | 0.5976 | −0.2663 |
| 51 | 0.6098 | −0.2643 |
| 52 | 0.6098 | −0.2643 |
| 53 | 0.6151 | −0.2657 |
| 54 | 0.6205 | −0.2671 |
| 55 | 0.6262 | −0.2685 |
| 56 | 0.6319 | −0.2696 |
| 57 | 0.6377 | −0.2712 |
| 58 | 0.6437 | −0.2725 |
| 59 | 0.6498 | −0.2737 |
| 60 | 0.6561 | −0.2750 |
| 61 | 0.6624 | −0.2762 |
| 62 | 0.6690 | −0.2774 |
| 63 | 0.6757 | −0.2785 |
| 64 | 0.6825 | −0.2796 |
| 65 | 0.6895 | −0.2807 |

TABLE 1-continued

Louver Profile Coordinates

| Point # | X | Y |
|---|---|---|
| 66 | 0.6967 | −0.2818 |
| 67 | 0.7041 | −0.2827 |
| 68 | 0.7116 | −0.2837 |
| 69 | 0.7194 | −0.2846 |
| 70 | 0.7274 | −0.2855 |
| 71 | 0.7355 | −0.2863 |
| 72 | 0.7440 | −0.2871 |
| 73 | 0.7526 | −0.2878 |
| 74 | 0.7614 | −0.2885 |
| 75 | 0.7705 | −0.2891 |
| 76 | 0.7799 | −0.2896 |
| 77 | 0.7895 | −0.2901 |
| 78 | 0.7995 | −0.2905 |
| 79 | 0.8097 | −0.2908 |
| 80 | 0.8202 | −0.2910 |
| 81 | 0.8310 | −0.2911 |
| 82 | 0.8423 | −0.2912 |
| 83 | 0.8538 | −0.2912 |
| 84 | 0.8657 | −0.2910 |
| 85 | 0.8780 | −0.2907 |
| 86 | 0.8907 | −0.2904 |
| 87 | 0.9039 | −0.2898 |
| 88 | 0.9175 | −0.2891 |
| 89 | 0.9315 | −0.2884 |
| 90 | 0.9461 | −0.2874 |
| 91 | 0.9612 | −0.2862 |
| 92 | 0.9768 | −0.2850 |
| 93 | 0.9930 | −0.2835 |
| 94 | 1.0099 | −0.2818 |
| 95 | 1.0274 | −0.2799 |
| 96 | 1.0456 | −0.2777 |
| 97 | 1.0645 | −0.2753 |
| 98 | 1.0842 | −0.2726 |
| 99 | 1.1047 | −0.2696 |
| 100 | 1.1261 | −0.2664 |
| 101 | 1.1484 | −0.2627 |
| 102 | 1.1716 | −0.2587 |
| 103 | 1.1960 | −0.2543 |
| 104 | 1.2214 | −0.2495 |
| 105 | 1.2479 | −0.2442 |
| 106 | 1.2759 | −0.2384 |
| 107 | 1.3051 | −0.2321 |
| 108 | 1.3357 | −0.2251 |
| 109 | 1.3680 | −0.2176 |
| 110 | 1.4018 | −0.2093 |
| 111 | 1.4376 | −0.2002 |
| 112 | 1.4752 | −0.1903 |
| 113 | 1.5148 | −0.1795 |
| 114 | 1.5568 | −0.1676 |
| 115 | 1.6011 | −0.1547 |
| 116 | 1.6482 | −0.1405 |
| 117 | 1.6980 | −0.1251 |
| 118 | 1.7510 | −0.1081 |
| 119 | 1.8073 | −0.0895 |
| 120 | 1.6674 | −0.0691 |
| 121 | 1.9315 | −0.0468 |
| 122 | 2.0000 | −0.0222 |
| 123 | 1.7423 | −0.1251 |
| 124 | 1.6740 | −0.1502 |
| 125 | 1.6105 | −0.1743 |
| 126 | 1.5513 | −0.1973 |
| 127 | 1.4962 | −0.2193 |
| 128 | 1.4448 | −0.2402 |
| 129 | 1.3966 | −0.2604 |
| 130 | 1.3515 | −0.2799 |
| 131 | 1.3093 | −0.2985 |
| 132 | 1.2695 | −0.3163 |
| 133 | 1.2321 | −0.3335 |
| 134 | 1.1970 | −0.3502 |
| 135 | 1.1636 | −0.3662 |
| 136 | 1.1325 | −0.3816 |
| 137 | 1.1029 | −0.3965 |
| 138 | 1.0749 | −0.4109 |
| 139 | 1.0485 | −0.4248 |
| 140 | 1.0234 | −0.4383 |
| 141 | 0.9997 | −0.4513 |
| 142 | 0.9771 | −0.4640 |
| 143 | 0.9556 | −0.4763 |
| 144 | 0.9352 | −0.4882 |
| 145 | 0.9159 | −0.4997 |
| 146 | 0.6974 | −0.5109 |
| 147 | 0.8797 | −0.5216 |
| 148 | 0.8629 | −0.5324 |
| 149 | 0.8469 | −0.5427 |
| 150 | 0.8315 | −0.5527 |
| 151 | 0.8170 | −0.5626 |
| 152 | 0.8029 | −0.5721 |
| 153 | 0.7895 | −0.5813 |
| 154 | 0.7767 | −0.5904 |
| 155 | 0.7645 | −0.5993 |
| 156 | 0.7526 | −0.6079 |
| 157 | 0.7414 | −0.6263 |
| 158 | 0.7305 | −0.6246 |
| 159 | 0.7201 | −0.6326 |
| 160 | 0.7101 | −0.6405 |
| 161 | 0.7005 | −0.6482 |
| 162 | 0.6913 | −0.6557 |
| 163 | 0.6824 | −0.6631 |
| 164 | 0.6739 | −0.6704 |
| 165 | 0.6657 | −0.6774 |
| 166 | 0.6578 | −0.6844 |
| 167 | 0.6501 | −0.6912 |
| 168 | 0.6427 | −0.6979 |
| 169 | 0.6357 | −0.7045 |
| 170 | 0.6288 | −0.7108 |
| 171 | 0.6223 | −0.7171 |
| 172 | 0.6159 | −0.7233 |
| 173 | 0.6098 | −0.7295 |
| 174 | 0.6038 | −0.7354 |
| 175 | 0.5981 | −0.7413 |
| 176 | 0.5926 | −0.7471 |
| 177 | 0.5873 | −0.7527 |
| 178 | 0.5820 | −0.7584 |
| 179 | 0.5770 | −0.7639 |
| 180 | 0.5271 | −0.7693 |
| 181 | 0.5675 | −0.7746 |
| 182 | 0.5630 | −0.7799 |
| 183 | 0.5585 | −0.7851 |
| 184 | 0.5543 | −0.7902 |
| 185 | 0.5502 | −0.7952 |
| 186 | 0.5462 | −0.8002 |
| 187 | 0.5424 | −0.8051 |
| 188 | 0.5387 | −0.6099 |
| 189 | 0.5350 | −0.8146 |
| 190 | 0.5315 | −0.8194 |
| 191 | 0.5281 | −0.8240 |
| 192 | 0.5246 | −0.8286 |
| 193 | 0.5216 | −0.8331 |
| 194 | 0.0000 | 0.0000 |

Figure 16:
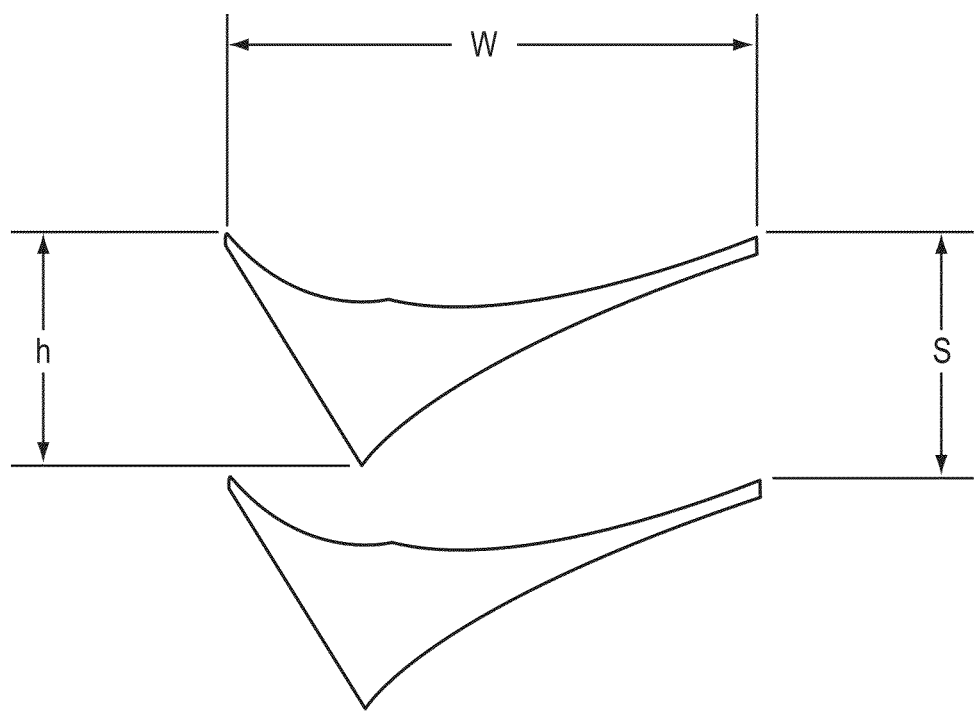
FIG. 16 illustrates the major dimensions of an embodiment of the invention.

The core of the daylighting system 10 is an array of reflective louvers 22 that redirect incoming light in a controlled manner deep into the space. FIG. 16 shows the relative positions of two louvers 22 in a stack. As depicted, the louvers 22 have a width w, a height h, and a spacing s. In certain embodiments, the width w is between about 1.0 inch and about 4 inches, the height h is between about 0.5 inches and about 2.0 inches, and the spacing s is between about 0.5 inches and about 2.0 inches. For example, in one embodiment, the width w is 2.016 inches, the height h is 0.880 inches, and the spacing s is 0.870 inches. In one embodiment, the louvers 22 have a constant cross-section (i.e., profile 28) in the direction normal to the page.

For reference, when the width w is 2.016 inches (5.12 cm), the height h is 0.880 inches (2.23 cm), and the spacing s is 0.870 inches (2.21 cm), a stack of about 27 louvers 22 is required to fill 0.6 m of facade height. The absolute size of the louver cross-section may be increased or decreased, but the ratio of the dimensions preferably remains the same for the device to function properly.

Designing a Louver Shape

Referring to FIGS. 17a-23 and Winston et al., pages 50-57, a suitable louver shape may be designed as follows.

As discussed herein, $\theta_{max}$ is the maximum output angle, and is the maximum angle between the compound parabolic concentrator axis (centerline of CPC) and any exiting ray. Angle φ is used to calculate the coordinates of the upper and lower profiles of the CPC profile. Angle φ ranges from $2 \times \theta_{max}$ to $90° + \theta_{max}$; the angle φ is measured from the center axis of a parabola of the CPC profile (corresponding to either the upper or the lower profile); the center axis of the parabola defines an angle $\theta_{max}$ with the CPC centerline axis. See FIG. 17a.

Additional relevant parameters are:
a'=half width of inlet aperture 30
a=half width of exit aperture 31
I=length of profile along centerline axis of CPC
f=focal length of parabola, which is a function of a' and $\theta_{max}$ If any two of a, a', I, and $\theta_{max}$ are chosen, the other parameters can be calculated.

For example, if $\theta_{max}$ and a are assigned specific values, then a' and I can be calculated as follows using the equations disclosed by Winston:

$a'$ can be calculated from $a$ and $\theta_{max}$     Equation 4.3 calculate I from $a$, $a'$, and $\theta_{max}$     Equation 4.4

$$a = \frac{a'}{\sin\theta_{max}} \quad a' = a * \sin\theta_{max}$$

$$l = \frac{a'(1 + \sin\theta_{max})\cos\theta_{max}}{\sin^2\theta_{max}}$$

Figure 17A:
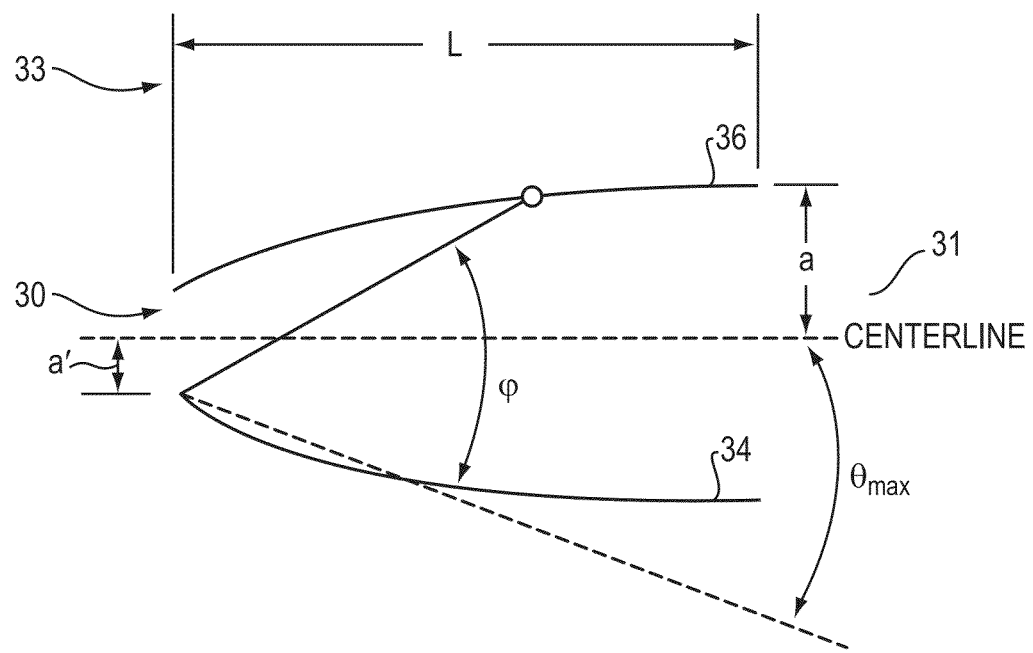
FIGS. 17a-23 are graphical representations illustrating a method for designing a louver profile in accordance with an embodiment of the invention.
Figure 17B:
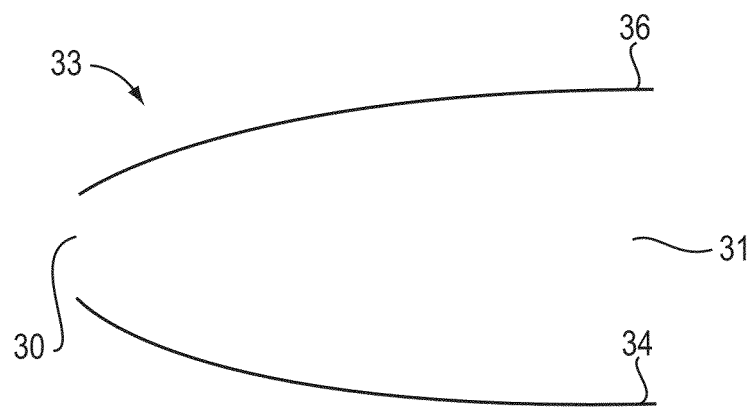

Referring to FIGS. 17a and 17b, following the equations given in Winston et al., create a CPC profile 33, having a lower profile 34 or lower compound parabolic concentrator profile that is equal to the negative of an upper profile 36 or upper compound parabolic concentrator profile. Each of the lower and upper profiles 34, 36 include a portion of a parabola. The CPC profile 33 has an inlet aperture 30, i.e., a small aperture, with a half-width of a', and an exit aperture 31, i.e., a large aperture, with a half-width of a, the large aperture being disposed downstream of the small aperture. The x and y coordinates of the parabolas forming the upper and lower profiles may be calculated by the three equations listed below, with φ ranging as indicated above.

$$x = \frac{2 * f * \sin(\varphi - \theta_{max})}{1 - \cos\varphi}$$

$$y = \frac{2 * f * \cos(\varphi - \theta_{max})}{1 - \cos\varphi}$$

Where, $f = a' * (1 + \sin\theta_{max})$.

Figure 18:
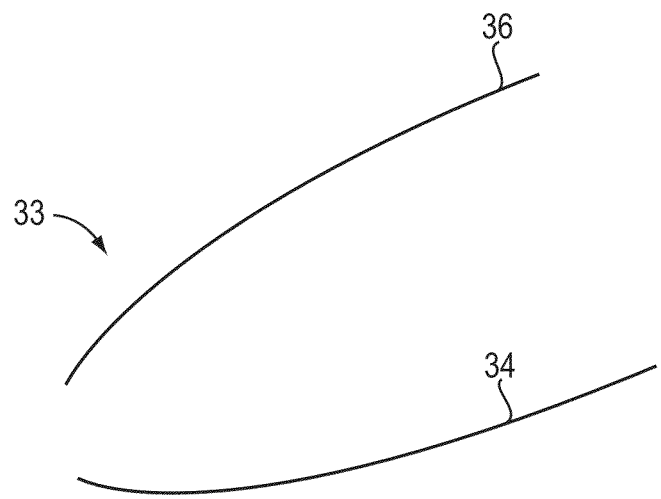

Referring to FIG. 18, rotate the CPC profile 33 counter-clockwise (for CPC orientation shown in picture) by a maximum output angle $\theta_{max}$.

Figure 19:
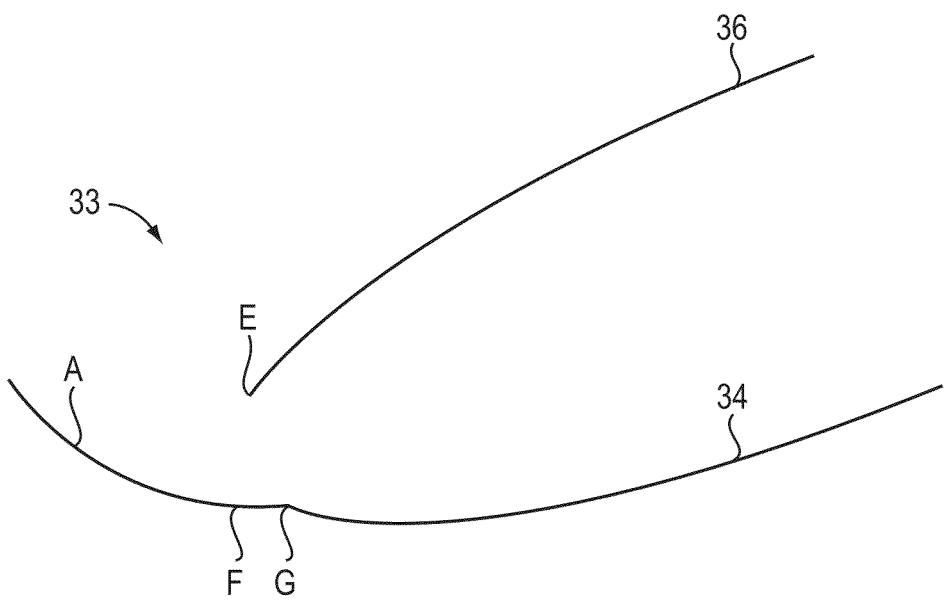

Referring to FIG. 19 and also to FIG. 12, add a parabola (surface A) with a vertical axis of symmetry using the left end (point E) (upstream end) of the upper CPC profile 36 as the focus and the left end of the lower CPC profile 34 (point G) (upstream end) as a point on the parabola. The vertex (point F) of the parabola is directly below point E (focus of parabola). The shape of the parabola is now defined and the stopping point for the parabola is determined in a subsequent step.

Figure 20:
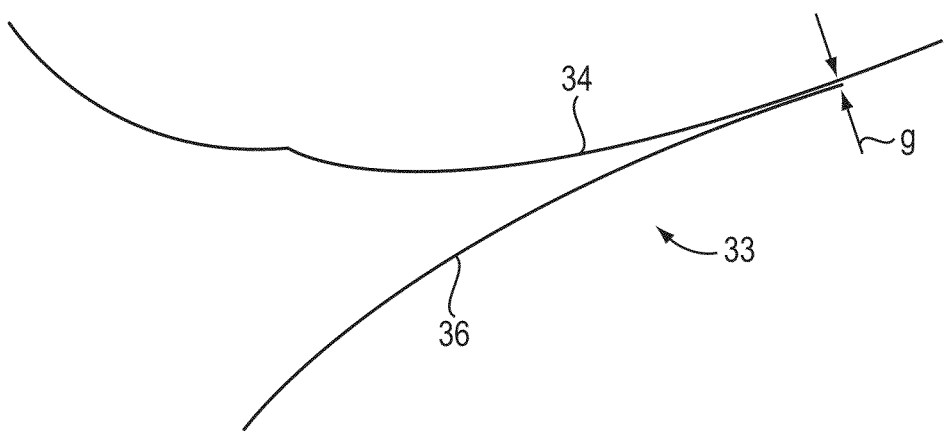

Referring to FIG. 20, move the upper CPC profile 36 vertically downwards far enough below the lower CPC 34 profile so that there is a small gap g between the trailing or downstream edges (right ends) of the two CPC profiles 34, 36. The small gap g is preferable because if the two CPC profiles 34, 36 touch, then the resulting trailing edge is infinitely thin. The exact size of gap g depends on manufacturing capabilities. In an embodiment, the small gap g may be, for example, 3 millimeters.

Figure 21:
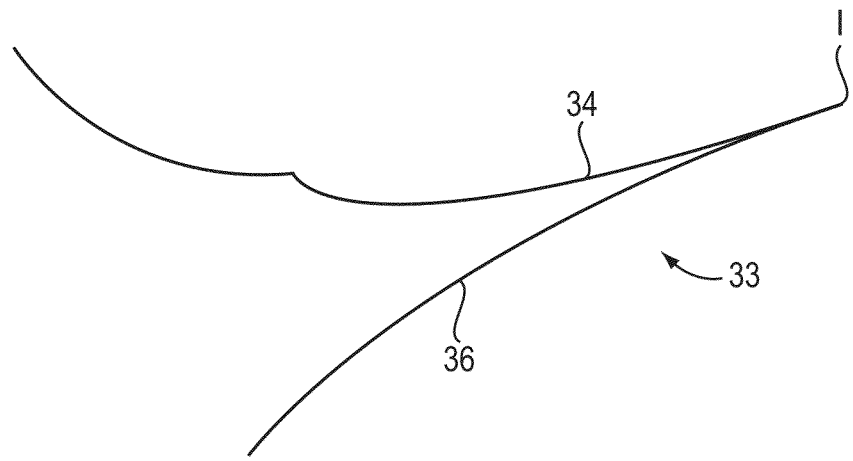

Referring to FIG. 21, add a line (i.e., the trailing connecting line) connecting the right ends (downstream ends) of the upper and lower CPC profiles 34, 36 to define the trailing edge (point I). The thickness of the trailing edge is determined as a function of manufacturing capabilities. The upper and lower CPC profiles 34, 36 may be approximately parallel to each other or may define a sharp point.

Figure 22:
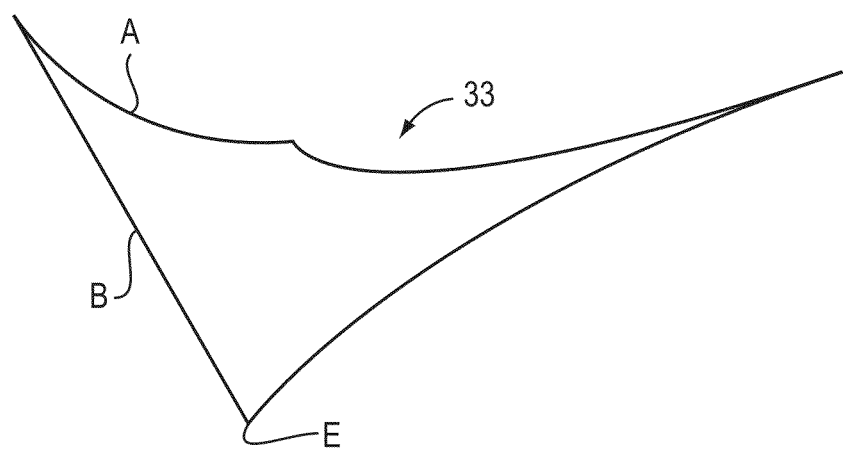

Referring to FIG. 22, add a line starting at the left end (i.e., upstream end) of the CPC profile 33 that is now lower (point E) and connect it to the parabola (surface A) to define surface B. The closer this line is to 45° from horizontal the better, but the point where the line intersects the parabola may be freely chosen. This completes the louver outline or CPC profile 33.

Figure 23:
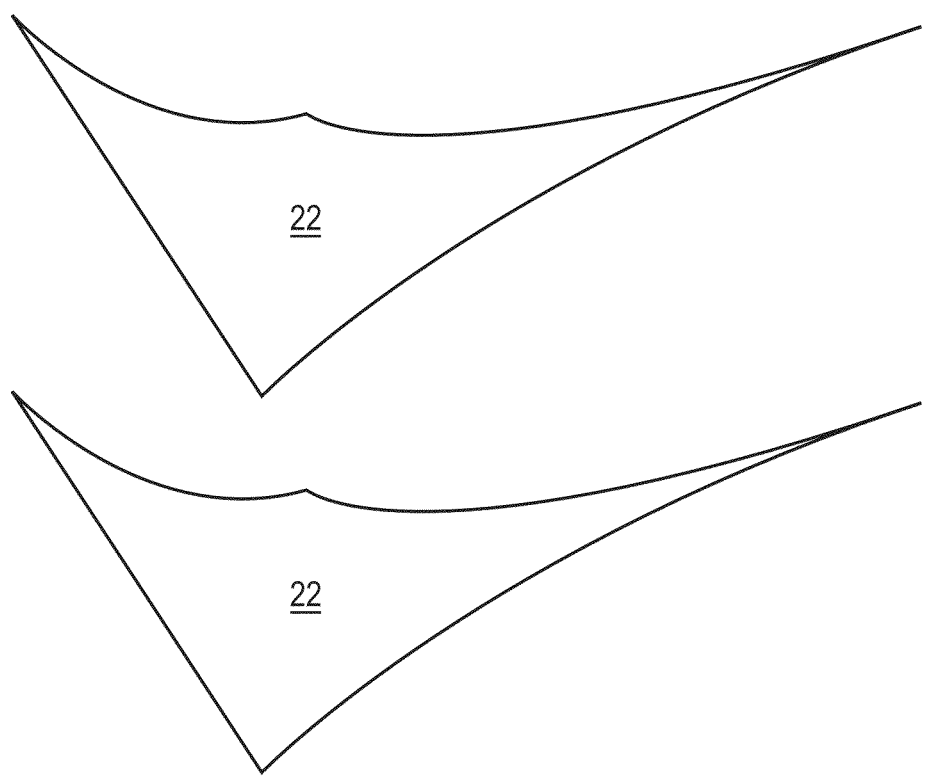

Referring to FIG. 23, to determine the positions of first and second louvers 22 with respect to one another, copy and move the completed louver outline vertically upwards or downwards by the same amount as the upper CPC profile 36 was moved, as discussed with respect to FIG. 20. For example, the distance between the respective leading edges of a first and second louver 22 may be 0.870 inches for two louvers 22 having a length of about 2 inches each (see FIG. 16).

Refractive Element

The louvers 22 change the elevation of the incoming light but they have little affect on the light's azimuth angle. Without the inclusion of a refractive element, such as refractive rods 24, under direct sun, the reflective ceiling typically exhibits a bright streak located on a line between the occupant's eyes and the sun. During mock-up testing (discussed below) a maximum brightness of about 350,000 candelas/m² (or 0.02% of the luminance of the sun at mid-day) was observed on the ceiling when using the louvers 22 without the refractive rods 24. While not debilitating if not at the center of the field of vision, this level of luminance may be too high for an office environment.

To mitigate glare concerns, a horizontal array of optically clear rods, made of a material with an index of refraction greater than 1, such as either acrylic or glass, placed at the outlet of the louvers 22 has the effect of spreading the incoming light in the azimuth direction, without affecting the light's elevation angle. Under direct sunlight conditions, the bright streak on the ceiling is replaced with a much larger area of lower brightness. Diffusing direct sunlight in this way helps prevent glare from being an issue. The total amount of light in the room may be modestly reduced by the addition of the rods, but the glare protection they provide may justify their inclusion.

A preferred material for the rods may be acrylic because it does not yellow from exposure to direct sunlight. It is also less brittle than glass and has a relatively low density. Acrylic is used in applications such as airplane windows, where the material is exposed to sunlight for extended periods of time.

Figure 24A:
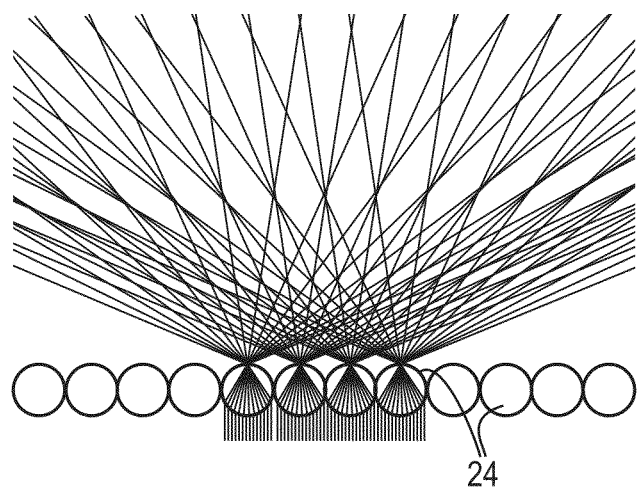
FIG. 24a-24b are graphs illustrating ray tracing through rods for two different azimuth angles.
Figure 24B:
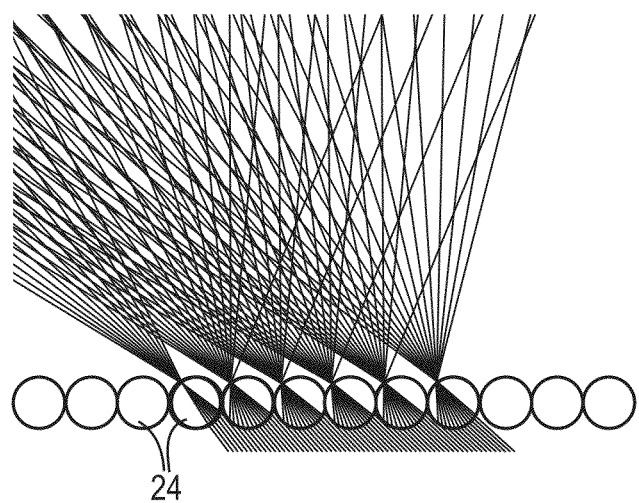

The main advantage of using refractive rods 24 instead of other light diffusing technologies is that the rods spread light out in the azimuth direction, without impacting the light's elevation angle. This is important because the light exiting the louvers has been collimated in the elevation direction. Other technologies, such as translucent glass, may diffuse light in all directions and have a lower overall transmittance than the clear rods. In some preferred embodiments, the refractive rods 24 or cylinders are made into a structurally sound inner glazing that prevents air infiltration; the design thereby reduces the transmission losses associated with the inner pane of glass. FIGS. 24*a*-24*b* provide an illustration of how the refractive rods 24 affect light passing through them, with ray tracing through rods shown for two different azimuth angles (0° and 45°, respectively).

The images of FIGS. 24*a*-24*b* show how light passing through the refractive rods 24 is spread out horizontally. The images show a top view looking down the length of the refractive rods 24. The light rays traced have a 0° elevation angle.

The diameter of the refractive rods 24 may be chosen based on project constraints. Thinner refractive rods 24 are typically preferred because they tend to weigh less and allow the window unit to be thinner. However, they are preferably not so thin that breakage is an issue during assembly and installation. A cost-effective solution requires balancing the typically lower cost of thinner rods in comparison to thicker ones, with the fact that the use of thinner rods may require that more total feet of rod be used to cover the same length of facade 13. A preferred rod diameter for many applications may be about 10 mm.

Other refractive elements may be used with embodiments of the daylighting system 10 of the invention, such as rods of non-circular cross-section. Also the refractive element(s) may be incorporated into the inner or outer glazing 18, 20 by varying the surface normal direction of one or both of the glazing's surfaces.

Reflective Ceiling

The final element of the daylighting system 10 is the reflective ceiling 14 or reflective panels on the ceiling. The purpose of the reflective ceiling is to redirect light emitted by the window unit deeper into the space. To limit glare and distracting mirrored reflections on the ceiling, the reflective surface may have a rough texture, which helps to scatter the light without totally eliminating its directionality. A minimum reflectance of the ceiling is preferably at least 50% luminous reflectivity, more preferably at least 80% luminous reflectivity, and most preferably at least 90% luminous reflectivity.

Rationale for Use

The greater the distance between a given louver 22 and the ceiling, the deeper light from that louver 22 may be able to penetrate into the room. For most office buildings the ceiling height is limited by the need to maximize rentable space. Therefore, the top louver 22 may be preferably located directly underneath the ceiling, and the bottom of the louver 22 is then typically approximately 0.6 m below the ceiling. If the surface of the ceiling had a typical matte or diffuse finish, then most of the light may hit the ceiling near the front of the room and be scattered onto the workplane immediately below. With a diffuse surface, the light tends to be scattered in all directions evenly so only a small portion may be reflected off the ceiling deeply into the space. In fact, half of the light hitting the ceiling bounces off heading back towards the facade 13. A low diffuse ceiling wastes much of the benefit of the louvers 22, because the ceiling cannot take advantage of the fact that the light impinges on it at a shallow angle.

Since increasing the distance from the louvers 22 to the ceiling generally is not an option, another solution to push light deeper is provided. Using a ceiling with a specular, rather than a diffuse surface, makes the overall system more effective. Light hitting the ceiling at a shallow angle bounces off at a shallow angle. This means that all the light may be directed deeper into the space at a favorable angle, rather than being diffusely scattered.

Surface Roughness

A concern with using a specularly reflective ceiling is that the reflection off the ceiling may be too bright when the louvers 22 are exposed to direct sun. If the ceiling is a purely specular mirror-like surface it may defeat the purpose of tilting the CPC section of the louver 22 upwards to protect occupants from glare, as the ceiling may be almost as bright as the louvers 22 themselves. The refractive rods 24 go a long way to mitigating this problem, but to further diffuse the incoming light, the design described herein incorporates a reflective ceiling with a rough texture. The effect of the bumps on the surface is to spread the light hitting off the ceiling, without totally eliminating the directionality of the light. By spreading the light, the peak brightness of the ceiling is lowered significantly. A secondary, though practical, benefit of making the surface of the ceiling rough is that potentially distracting mirror images on the ceiling will not be discernible to the office's occupants.

Depth Of Reflective Ceiling

Figure 25:
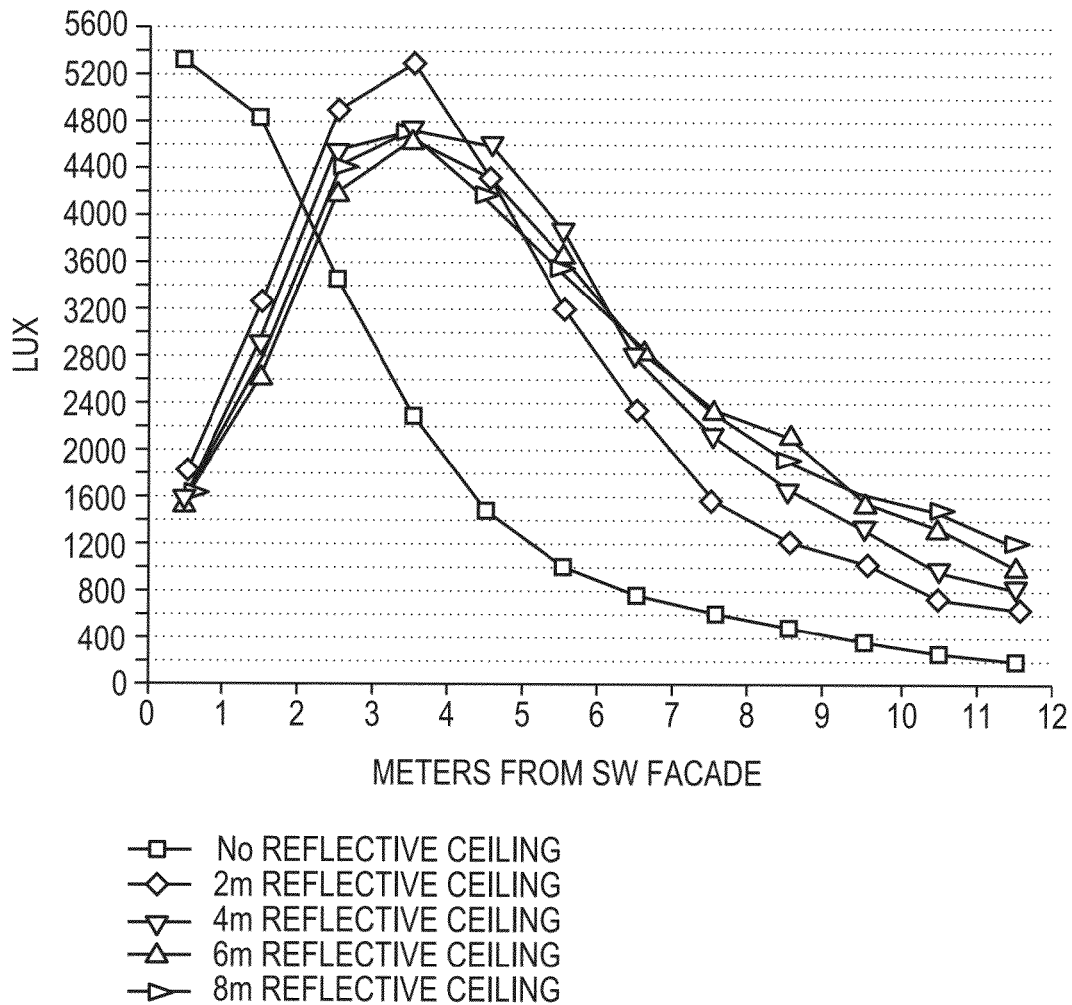
FIG. 25 is a graph illustrating workplane illuminance for different reflective ceiling lengths.

The distance the reflective surface extends inwards from the facade is preferably to be 6 m for a 12+m deep space. However, the length of the reflective ceiling may be shortened to 4 m without a major impact on the overall performance. The effect of shortening the ceiling reflector is to reduce illumination at the back of the daylit space, but it has a negligible impact on the illumination in the front two-thirds of the space. FIG. 25 is a graph of workplane illuminance for different reflective ceiling lengths, showing how the pattern of illuminance is affected by varying the length of the reflective ceiling (note that the system embodiment associated with FIG. 25 does not include the refractive rods).

Although the magnitude of the illuminances is different for the sunny and overcast cases, the relative pattern of the plots remains the same. Incorporating a reflective ceiling of 2 m or more shifts the peak illuminance deeper into the room by about 3 m, from 0.5 m from the facade to about 3.5 m. Peak illuminance is generally lowered as the length of the reflective ceiling is increased from 0 to 4 m, but after that it remains largely unchanged. Limiting the maximum illuminance is an important goal, given that the level of illumination is relatively high under direct sun, so the reflective ceiling is preferably not less than 4 m long. Past 4 m, the main effect of the reflective ceiling is to increase the light levels near the back of the daylit zone. However, each additional unit of length provides diminishing returns, and extending the reflective ceiling past 6 m may not be practical. The rest of the ceiling beyond the end of the reflective section may use the standard acoustical tile layout.

Surface Properties of System

The surfaces of the louver 22 are preferably highly reflective to increase the overall transmittance of the daylighting system 10. Two possible fabrication processes include a) making the louver 22 out of a metal such as aluminum by, e.g., extrusion or die casting and finely polish its outer surfaces, or b) injection molding the louver 22 from a polymer, e.g., plastic. To create the reflective surface, a deposition process, such as metallization by vacuum deposition, may be used to coat the louver 22 with a reflective material, possibly aluminum or silver. In some embodiments, the louver 22 may be coated with a reflective film, such as a sheet of MYLAR or Daylighting Film DF2000MA available from 3M. Preferably, the reflectance of the finished louver surface is at least 50% luminous reflectivity, more preferably 92% luminous reflectivity, even more preferably greater than 95%, and most preferably greater than 98%. The thickness of a louver 22 coating may be taken into consideration during the design of the louver 22, such that the dimensions of a louver substrate in combination with the coating match the dimensions of the designed profile.

The importance of a high reflectance value is amplified by the fact that most of the light rays bounce off the louvers 22 multiple times on their way through the louver channel 26. Table 2 shows the effects on effective reflectance for different surface reflectances for light that bounces off the louvers three times. A seemingly small increase, or decrease, in reflectance can have a large effect on the total percentage of incident light transmitted through the system.

TABLE 2

Effective Reflectance for Multiple Bounces

| Material Reflectance (fraction) | Effective Reflectance for Three Bounces (fraction) |
|---|---|
| 0.800 | 0.512 |
| 0.880 | 0.681 |
| 0.920 | 0.779 |
| 0.950 | 0.857 |
| 0.980 | 0.941 |

The ceiling material may be a highly reflective material with a somewhat bumpy surface. The bumpy surface circumvents having a mirrored ceiling, which may be distracting to room occupants. The bumps also help even the reflected illumination. A suitable material may be, e.g., the MIRO Stucco G product made by Alanod. Although the reflectance of the ceiling material is preferably as high as possible, the reflectance is less critical for this surface than for the surface of the louvers 22. This is because light will only bounce off the ceiling once, rather than multiple times.

EXAMPLES

Case Study

Figure 26A:
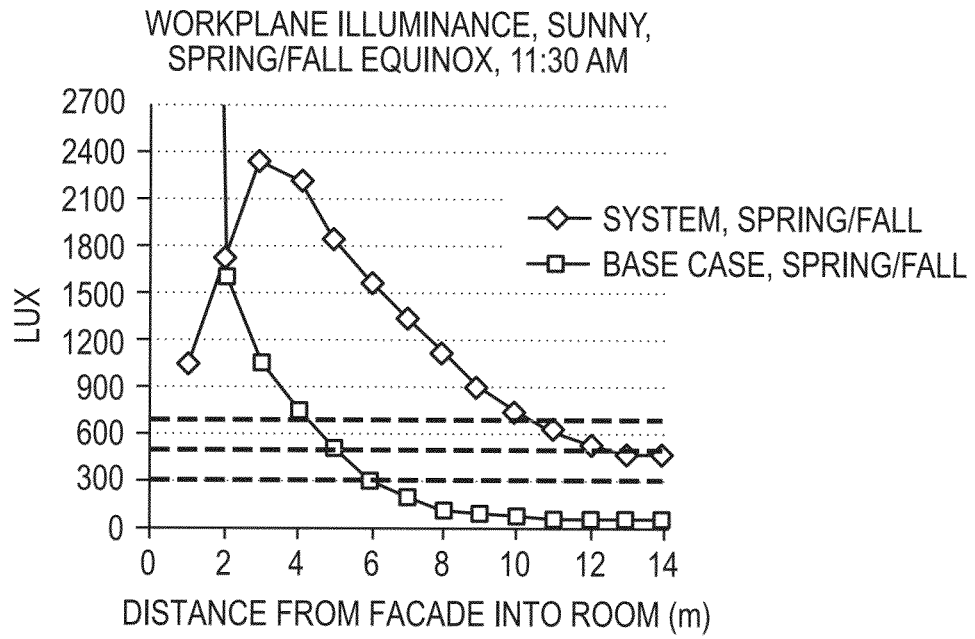
FIGS. 26a-26d are graphs illustrating workplane illuminance for selected time steps along the centerline of the room for the system and base cases.
Figure 26B:
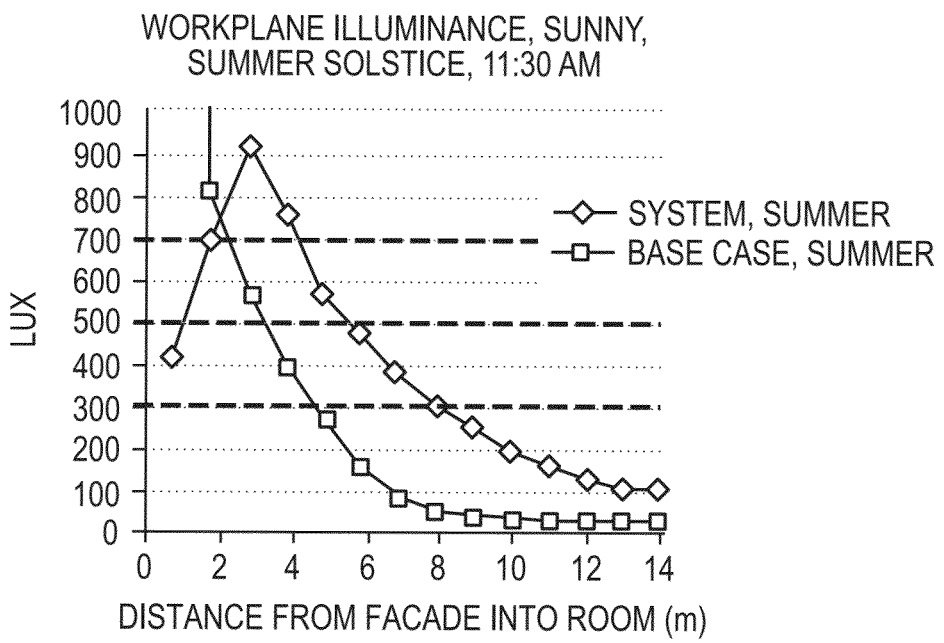
Figure 26C:
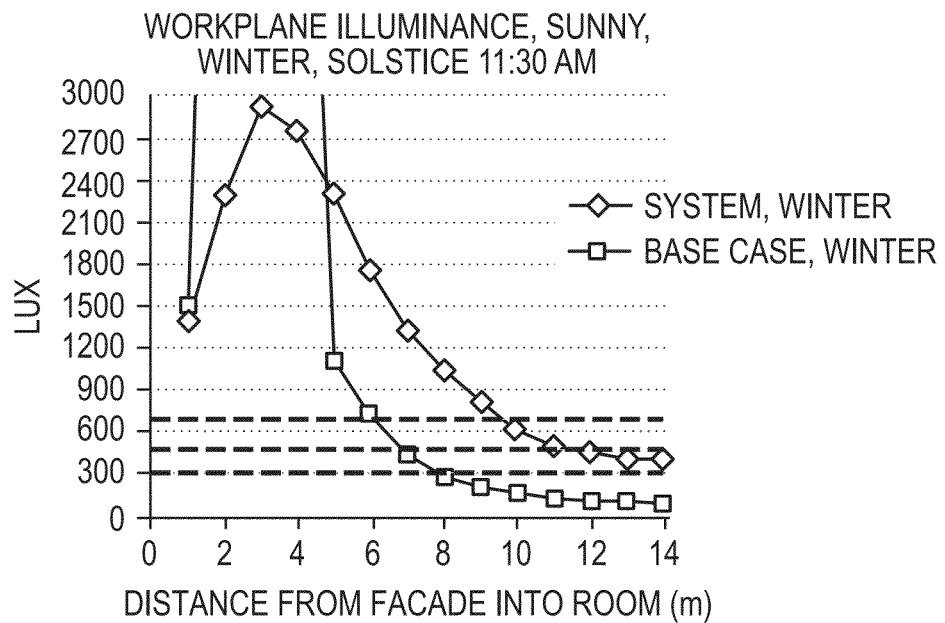
Figure 26D:
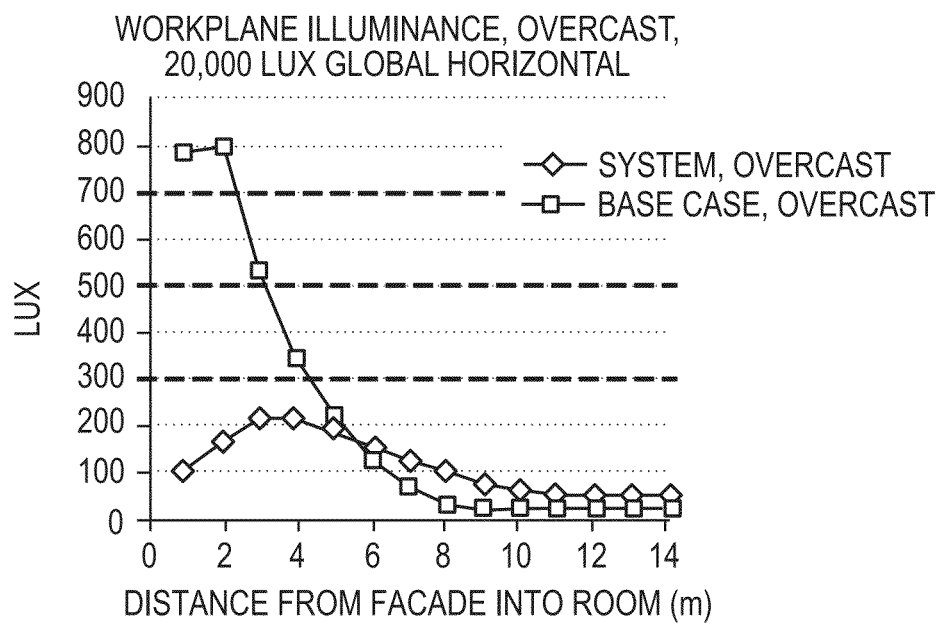

A quantitative example of how the system performs is as follows. FIGS. 26a-26d shows the results of a particular case study building space with the full daylighting system versus an unshaded window for four different representative sky conditions. FIGS. 26a, 26b, and 26c shows the workplace illuminance of embodiments of the invention and base cases for sunny conditions, while FIG. 26d shows the workplace illuminance of embodiments of the invention and base cases for overcast conditions. The lighting simulation program Radiance was used to run the simulations.

The reference case chosen was a room 37 m in width, 15 m in depth, and 2.8 m in height. The facade was south-facing and had a 15° sky obstruction. This case was chosen because it has a favorable room size and orientation for the system, while still including some sky obstructions.

The following conditions apply:
Simulations use Tokyo weather data obtained from the Energy Plus Tokyo weather file.
All times are in local legal time, not solar time.
Illuminance values are reported on a workplane 0.75 m from the floor along the centerline of the room.
Simulations combine the results of the upper clerestory windows and lower view windows so that the lighting contribution from the partially closed blinds in the lower window is included.

The facade below 2.09 m from the floor is unchanged for all cases: the blinds are closed at a 65° angle to keep out all direct sun but still allow through some diffuse daylight. The system case fills the top 0.71 m of the facade with the daylighting window unit (including the frame), whereas the unshaded base case leaves the top 0.71 m of the glazed facade uncovered. The other facades are fully opaque for all cases. FIGS. 26a-26d provide workplane illuminance for selected time steps along the centerline of the room for the system and base cases. Dashed lines demarking 300, 500, and 700 lux are included as they are common minimum illuminance requirements for office spaces. The conditions at which centerline workplane Illuminance was determined are as follows:

FIG. 26a: Sunny, Spring/Fall, 11:30 am (Base Case Peak: 20,638 Lux);
FIG. 26b: Sunny, Summer, 11:30 am (Base Case Peak: 3665 lux);
FIG. 26c: Sunny, Winter, 11:30 am (Base Case Peak: 19,009 Lux); and
FIG. 26d: Overcast, 20,000 Lux Global Horizontal Illuminance.

Under sunny conditions, the louver system outperforms the respective base case throughout the year. Light levels at the back of the room are 400 to 1000% higher when using the louver system, compared to the base case. Also, the louver system avoids the extremely high peak illuminance seen in the base case resulting from direct sunlight transmission.

Under totally overcast conditions, the overall illuminance levels for all systems are much lower. It is common for passive daylighting systems to perform significantly worse than an uncovered window under cloudy conditions because of the light absorbed by the daylighting systems itself. The louver system still outperforms the uncovered window at distances greater than 5 m from the facade, although the absolute light levels are modest. For cases where there is significant sky obstruction near the horizon due to the building's surroundings, the louver system performs even better relative to the uncovered window case. This is because the uncovered window relies on light from near the horizon to illuminate the deep parts of the space, unlike the louver system. For the open window case to be a viable option it may require some type of dynamic shading system to shield the office space from direct sunlight, a drawback from which the louver system does not suffer.

As one may expect, the system provides significantly more light when direct sun is present. As a result, the system performs best when it has good exposure to the south (or the north in the southern hemisphere).

Initial Physical Mock-Up

The design has been reduced to practice through a mock-up that includes all three light directing elements (louvers, rods, and ceiling). A physical prototype of the system was built to test for glare problems as well as to obtain a qualitative understanding of what the system may look like. To produce the louver prototype, a 3D version of the louver was modeled in the Computer Aided Design (CAD) program Pro/Engineer Wildfire 2.0. The edges of the individual louvers were designed so that they may stack together with the proper spacing. The parts were then exported as STL files that may be read by a 3D printer made by Dimension. The 3D printer is able to build complex shapes by depositing one layer of molten ABS plastic at a time, much the same way a paper printer creates a page of text by marking one line at a time.

Once the louvers were complete, the surfaces were covered by a thin sheet of reflective material. Strips of the reflective film were cut to size and attached to the plastic louver using double-sided tape. The film conformed to the profile of the plastic, resulting in a louver with the correct shape and surface reflectance. The individual louvers were then assembled into a single unit, seven channels tall. The louver assembly was enclosed in a glazing unit with clear glass on either side.

Because of the dimensional limitations of the 3D printer, as well as assembly time and cost considerations, the louver assembly prototype built was a small subset of the real size of the louver assembly. The louver's cross section was built to scale (2" or 0.051 m wide), but length and total number of louvers was reduced. The dimensions of the completed unit were 0.271 m wide and 0.147 m tall, not including the frame.

The refractive rods are stock parts available from McMaster-Carr and a variety of other suppliers. The rods were cut to length and then their tops and bottoms were glued to strips of wood.

To create the reflective ceiling, sheets of rough reflective material (Cinegel #3803: Roscoflex S) were glued to the underside of a large board measuring 2'×6' (0.61×1.83 m). Legs 5'6" (1.68 m) tall were attached to the corners of the board to provide a proper amount of vertical clearance to the ground. A high strength VELCRO hook and loop fastening strip was added to the underside of the board as well as the top of the glazing unit so that the glazing unit and rod assembly may be easily attached and removed from the ceiling assembly.

In the physical mock-up described herein, the material used for the ceiling was made by a lighting effects company named Rosco. The name of the product used is "Cinegel #3803: Roscoflex S". The material is a vinyl backed foil, and therefore it is not a suitable material for making ceiling panels. Rosco does not measure the reflectance of this material, so although it appears to be highly reflective, the actual reflectance value is unknown.

The completed mock-up was assembled and tested on an open area.

Tokyo Mock-Up

In order to validate the Radiance simulation results, as well as test for glare problems more explicitly, a more sophisticated full-scale mock-up of the daylighting system was subsequently erected in a Tokyo office building.

After the profile of the louver was finalized, CAD drawings were sent out for fabrication. The louvers were produced through an aluminum extrusion process. Aluminum alloy 6063-T5, a common material for extrusion, was used.

Although aluminum was chosen for this prototype, a polymer may be used instead. Aluminum was selected to maintain flexibility in the method by which the surface may be made reflective. The outer surfaces of the louvers may be made reflective by a) fine polishing, b) metal vapor deposition, or c) applying an adhesive-backed reflective film. Choosing plastic as the substrate material may have eliminated fine polishing as an option. Ultimately, the adhesive-backed reflective film was chosen for the mock-up and after the louvers were produced, they were machine-wrapped with an adhesive-backed reflective film. The louvers were then assembled into an array by affixing them to endplates. Through-holes were drilled into the endplates at the correct locations and screws were inserted into tapped holes in the louvers.

Production of the acrylic rod assemblies was considerably simpler than of the louvers. The rods were commercially available, so a quantity of 10 mm diameter acrylic rods was purchased and cut to the proper length. Sets of rods were then combined into 0.6 m wide assemblies by gluing their top and bottom ends to common endplates.

The louver and rod assemblies were then installed into a frame structure, which also included a pane of glass on the room side of the frame. An exterior-side glazing was unnecessary because the mock-up was to be installed behind the existing single pane window in the test office. The dimensions of each completed daylighting window module, including its frame, were 1.8 m (width)×0.71 m (height)×0.085 m (depth). Thirty individual louvers with a vertical spacing of 22.1 mm were used to fill the height of each module.

The reflective ceiling material was also commercially available. The particular material used for this mock-up was the anodized version of Alanod's Miro Stucco G aluminum sheet. This material has the high reflectance and specularity and rough texture called for by the system's design. Sheets of the material were temporarily affixed to the existing acoustical tile ceiling.

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. A louver for a daylighting system comprising:
    a leading edge defined by an intersection of:
        a parabolic concentrator surface, and
        a flat surface; and
    a trailing edge defined by an intersection of:
        a lower compound parabolic concentrator profile, and
        an upper compound parabolic concentrator profile.

2. The louver of claim 1, wherein the leading edge is further defined by a leading connecting surface disposed between the parabolic concentrator surface and the flat surface.

3. The louver of claim 1, wherein the trailing edge is further defined by a trailing connecting surface disposed between the lower compound parabolic concentrator profile and the upper compound parabolic concentrator profile.

4. The louver of claim 1, wherein the parabolic concentrator surface, flat surface, lower compound parabolic concentrator profile, and upper compound parabolic concentrator profile define an asymmetric profile.

5. The louver of claim 4, wherein the asymmetric profile comprises a generally triangular profile.

6. The louver of claim 5, further comprising an apex disposed between the leading edge and the trailing edge.

7. The louver of claim 6, wherein the apex is disposed in a downward direction from the leading and trailing edges.

8. The louver of claim 6, wherein an upper surface formed between the leading edge and the trailing edge comprises a discontinuous contour.

9. The louver of claim 8, wherein the discontinuous contour comprises a pair of arcuate surfaces meeting at a boundary line.

10. The louver of claim 6, wherein an inlet surface formed between the leading edge and the apex comprises the flat surface.

11. The louver of claim 6, wherein an outlet surface formed between the apex and the trailing edge comprises the lower compound parabolic concentrator profile.

12. The louver of claim 1, wherein at least one of the parabolic concentrator surface, flat surface, lower compound parabolic concentrator profile, and upper compound parabolic concentrator profile comprises a reflective surface.

13. The louver of claim 12, wherein the reflective surface is at least partially specular.

14. The louver of claim 12, wherein the reflective surface is formed by at least one of a deposition process, a reflective film coating, or a polishing step.

15. The louver of claim 1, wherein a profile defined by the parabolic concentrator surface, flat surface, lower compound parabolic concentrator profile, and upper compound parabolic concentrator profile is defined by at least one of extrusion and molding.

16. The louver of claim 1, wherein an angle of the flat surface with respect to horizontal is about 45°.

17. A louver for a daylighting system comprising,
   a leading edge defined by an intersection of:
      a parabolic concentrator surface, and
      a flat surface;
   a trailing edge defined by an intersection of:
      a lower compound parabolic concentrator profile, and
      an upper compound parabolic concentrator profile; and
   an apex disposed between the leading edge and the trailing edge, in a downward direction from the leading and trailing edges,
   wherein (i) the parabolic concentrator surface, flat surface, lower compound parabolic concentrator profile, and upper compound parabolic concentrator profile define an asymmetric profile comprising a generally triangular profile and (ii) a height measured between the leading edge and the apex is selected from a range of about 0.5 inches to about 2.0 inches.

18. A louver for a daylighting system comprising:
   a leading edge defined by an intersection of:
      a parabolic concentrator surface, and
      a flat surface; and
   a trailing edge defined by an intersection of:
      a lower compound parabolic concentrator profile, and
      an upper compound parabolic concentrator profile
   wherein at least one of the parabolic concentrator surface, flat surface, lower compound parabolic concentrator profile, and upper compound parabolic concentrator profile comprises a reflective surface, and a minimum reflectance of the reflective surface is selected from the group consisting of 50% reflectance, 92% reflectance, 95% reflectance, and 98% reflectance.

19. A louver for a daylighting system comprising:
   a leading edge defined by an intersection of:
      a parabolic concentrator surface, and
      a flat surface; and
   a trailing edge defined by an intersection of:
      a lower compound parabolic concentrator profile, and
      an upper compound parabolic concentrator profile,
   wherein a width between the leading edge and the trailing edge is selected form a range of about 1.0 inches and about 4.0 inches.

* * * * *